United States Patent
Phipps et al.

(10) Patent No.: US 8,126,616 B2
(45) Date of Patent: Feb. 28, 2012

(54) VEHICLE SEATING SYSTEM AND METHOD

(75) Inventors: Paul B. Phipps, Fishers, IN (US); Tom D. Epply, Anderson, IN (US)

(73) Assignee: Innovative Biomechanical Solutions, LLC, Anderson, IN (US)

( * ) Notice: Subject to any disclaimer, the term of this patent is extended or adjusted under 35 U.S.C. 154(b) by 1113 days.

(21) Appl. No.: 11/953,256

(22) Filed: Dec. 10, 2007

(65) Prior Publication Data

US 2008/0091322 A1 Apr. 17, 2008

Related U.S. Application Data

(63) Continuation-in-part of application No. 11/241,264, filed on Sep. 30, 2005, now Pat. No. 7,422,285.

(51) Int. Cl.
*B60N 2/02* (2006.01)

(52) U.S. Cl. ............ 701/49; 296/63; 296/64; 297/217.3; 701/48

(58) Field of Classification Search ............ 296/63, 296/24, 64; 297/217.3; 701/48, 49
See application file for complete search history.

(56) References Cited

U.S. PATENT DOCUMENTS

| | | | |
|---|---|---|---|
| 4,722,550 A | 2/1988 | Imaoka et al. | |
| 4,728,873 A * | 3/1988 | Inoue et al. | 318/568.1 |
| 4,840,425 A | 6/1989 | Noble | |
| 4,853,687 A * | 8/1989 | Isomura et al. | 340/5.1 |
| 4,888,535 A * | 12/1989 | Brusasco | 318/568.1 |
| 5,005,904 A | 4/1991 | Clemens et al. | |
| 5,097,185 A * | 3/1992 | Ogasawara | 318/268 |
| 5,127,708 A | 7/1992 | Kishi et al. | |
| 5,129,704 A | 7/1992 | Kishi et al. | |
| 5,155,685 A | 10/1992 | Kishi et al. | |
| 5,243,267 A | 9/1993 | Ogasawara | |
| 5,285,139 A * | 2/1994 | Ogasawara | 318/466 |
| 5,320,409 A | 6/1994 | Katoh et al. | |
| 5,321,617 A | 6/1994 | Mori et al. | |
| 5,411,468 A | 5/1995 | Chen | |
| 5,455,494 A | 10/1995 | Ogasawara | |
| 5,490,713 A | 2/1996 | Fukuoka | |
| 5,497,326 A | 3/1996 | Berland et al. | |
| 5,498,061 A | 3/1996 | Fukuoka | |
| 5,507,557 A | 4/1996 | Fukuoka | |

(Continued)

FOREIGN PATENT DOCUMENTS

WO  WO 2007/041099 A  4/2007

OTHER PUBLICATIONS

International Search Report, International Application No. PCT/US08/51563, dated Jul. 1, 2008, 3 pages.

(Continued)

*Primary Examiner* — Khoi Tran
*Assistant Examiner* — Stephen Holwerda
(74) *Attorney, Agent, or Firm* — Woodard, Emhardt, Moriarty, McNett & Henry LLP

(57) ABSTRACT

A vehicle seating system including a seat and at least one powered seat adjustment actuator for altering the seating position formed by the seat. Additionally, the system includes a vehicle braking system including vehicle brakes and a brake pedal. The system further includes a signal sent in response to application of the vehicle brakes which leads to suspension of movement of the actuator during application of the vehicle brakes.

27 Claims, 20 Drawing Sheets

U.S. PATENT DOCUMENTS

| | | | |
|---|---|---|---|
| 5,516,192 | A | 5/1996 | Fukuoka |
| 5,523,664 | A | 6/1996 | Ogasawara |
| 5,533,784 | A | 7/1996 | Fukuoka |
| 5,542,741 | A | 8/1996 | Fukuoka |
| 5,556,161 | A | 9/1996 | Fukuoka |
| 5,637,076 | A | 6/1997 | Hazard et al. |
| 5,647,633 | A | 7/1997 | Fukuoka |
| 5,812,399 | A | 9/1998 | Judic et al. |
| 5,816,653 | A | 10/1998 | Benson |
| 5,860,699 | A | 1/1999 | Weeks |
| 5,903,122 | A | 5/1999 | Mesnage et al. |
| 5,930,152 | A | 7/1999 | Dumont et al. |
| 5,934,748 | A | 8/1999 | Faust et al. |
| 6,007,151 | A | 12/1999 | Benson |
| 6,033,021 | A | 3/2000 | Udo et al. |
| 6,049,748 | A | 4/2000 | Newman et al. |
| 6,053,880 | A | 4/2000 | Sleichter, III |
| 6,055,473 | A | 4/2000 | Zwolinski et al. |
| 6,129,419 | A | 10/2000 | Neale |
| 6,497,454 | B1 | 12/2002 | Davidsson |
| 6,590,354 | B2 | 7/2003 | Hein |
| 6,592,533 | B1 | 7/2003 | Yonekawa et al. |
| 6,682,494 | B1 | 1/2004 | Sleichter, III et al. |
| 6,814,410 | B2 | 11/2004 | Piaulet et al. |
| 6,820,895 | B2 | 11/2004 | Levine |
| 7,145,263 | B2 | 12/2006 | Nathan et al. |
| 7,152,920 | B2 | 12/2006 | Sugiyama et al. |
| 7,172,247 | B2 | 2/2007 | Beloch et al. |
| 7,239,096 | B2 | 7/2007 | Hancock et al. |
| 7,322,651 | B2 | 1/2008 | Makhsous et al. |
| 7,422,285 | B2 | 9/2008 | Phipps |
| 7,532,964 | B2 | 5/2009 | Fujita et al. |
| 7,585,024 | B2 | 9/2009 | Rogers |
| 2002/0070591 | A1 | 6/2002 | Nivet |
| 2002/0190549 | A1 | 12/2002 | Chien-Chuan |
| 2003/0075959 | A1 | 4/2003 | Xue et al. |
| 2004/0122574 | A1 | 6/2004 | Inman et al. |
| 2005/0127728 | A1 | 6/2005 | Sugiyama |
| 2007/0102969 | A1 | 5/2007 | Phipps |
| 2007/0241595 | A1 | 10/2007 | Nathan et al. |

OTHER PUBLICATIONS

Written Opinion of the International Searching Authority, International Application No. PCT/US08/51563, dated Jul. 1, 2008, 5 pages.
European Search Report for EP 08253931.3-2424 dated Jul. 8, 2009.
International Search Report for PCT/US06/37475, dated Jul. 16, 2007, 3 pages.
Written Opinion for PCT/US06/37475, dated Jul. 16, 2007, 4 pages.

* cited by examiner

VEHICLE SEATING SYSTEM AND METHOD

CROSS-REFERENCE TO RELATED APPLICATIONS

This application is a continuation-in-part of U.S. Ser. No. 11/241,264, filed Sep. 30, 2005 now U.S. Pat. No. 7,422,285, and priority and the benefit of Ser. No. 11/241,264 are claimed in the present application to the extent the subject matter of this application is found in the previously filed application. The content of that application is incorporated herein by reference.

FIELD OF THE DISCLOSURE

The present invention relates to vehicle seating systems and methods, and in particular, systems and methods for suspending seat adjustment during application of vehicle brakes.

BACKGROUND OF THE DISCLOSURE

Vehicle passengers and drivers often experience various effects of traveling in a vehicle, and in particular, due to long distance traveling. Compressive forces on the bones and joints can cause muscle fatigue, muscle stiffness and other related problems resulting from a person's body being in a stationary position for relatively long periods. Additionally, pressure points can develop creating a medical condition known as ischemia. Ischemia is a restriction in blood supply, or in other words, an inadequate flow of blood to a part of the body, caused by the constriction or blockage of blood vessels. Relatively long periods of stationary positioning can cause ischemia to occur in various parts of the body producing patterns of discomfort, aches and pains. In response, a person naturally tends to change positions, even if only by a slight movement, impacting the person's circulation and restoring adequate blood flow to the affected area improving the person's comfort level.

The fatigue and stiffness experienced by different muscle groups, and the effects felt as a result of ischemia, while traveling can be problematic for a vehicle user. Many travelers often find themselves adjusting their body in the vehicle seat or adjusting various seat position adjustment actuators or therapeutic controls individually, attempting to achieve greater traveling comfort. Moreover, remaining in a stationary position for long periods of time can have various negative effects on a vehicle traveler's health, including the suspected chance of blood clot formation as well as various other ailments.

In many situations, safety is also a concern for vehicle drivers and passengers while adjusting their body in the vehicle seat in attempting to achieve greater comfort or during movement of various seat position adjustment actuators. Accordingly, for many vehicle passengers and drivers, it is often desirable to reduce, decrease or suspend movement of their bodies and the vehicle seat during critical events involving the vehicle, such as braking as an example.

There is a need for improved vehicle systems and methods. Certain embodiments address these and other needs.

SUMMARY OF THE DISCLOSURE

In one aspect of the present disclosure, a system comprises a vehicle seating system including a seat and at least one powered seat adjustment actuator for altering the seating position formed by the seat. Additionally, the system includes a vehicle braking system including vehicle brakes and a brake pedal. The system further includes a signal sent in response to application of the vehicle brakes which leads to suspension of movement of the actuator during application of the vehicle brakes.

In another aspect of the present disclosure, a system comprises vehicle seating means, seat adjustment means for altering the seating position formed by the vehicle seating means, and vehicle braking means for decelerating the vehicle. The system additionally includes sensing means for detecting activation of the vehicle braking means and means for suspending movement of the seat adjustment means during application of the vehicle braking means.

In yet another aspect of the present disclosure, a method comprises providing a seat mountable in a vehicle, providing at least one powered seat adjustment actuator movable between a respective first position and a respective second position for altering the seating position formed by the seat, and activating movement of the powered seat adjustment actuator with an electrical controller. Additionally, the method includes sensing braking of the vehicle, sending a signal in response to sensing braking of the vehicle, and suspending movement of the powered seat adjustment actuator in response to the sending a signal.

The invention is set forth by the claims, and it is not limited by the foregoing.

It is an object of certain embodiments to provide an improved vehicle seating system and method.

BRIEF DESCRIPTION OF THE ILLUSTRATED EMBODIMENTS

Figure 1:
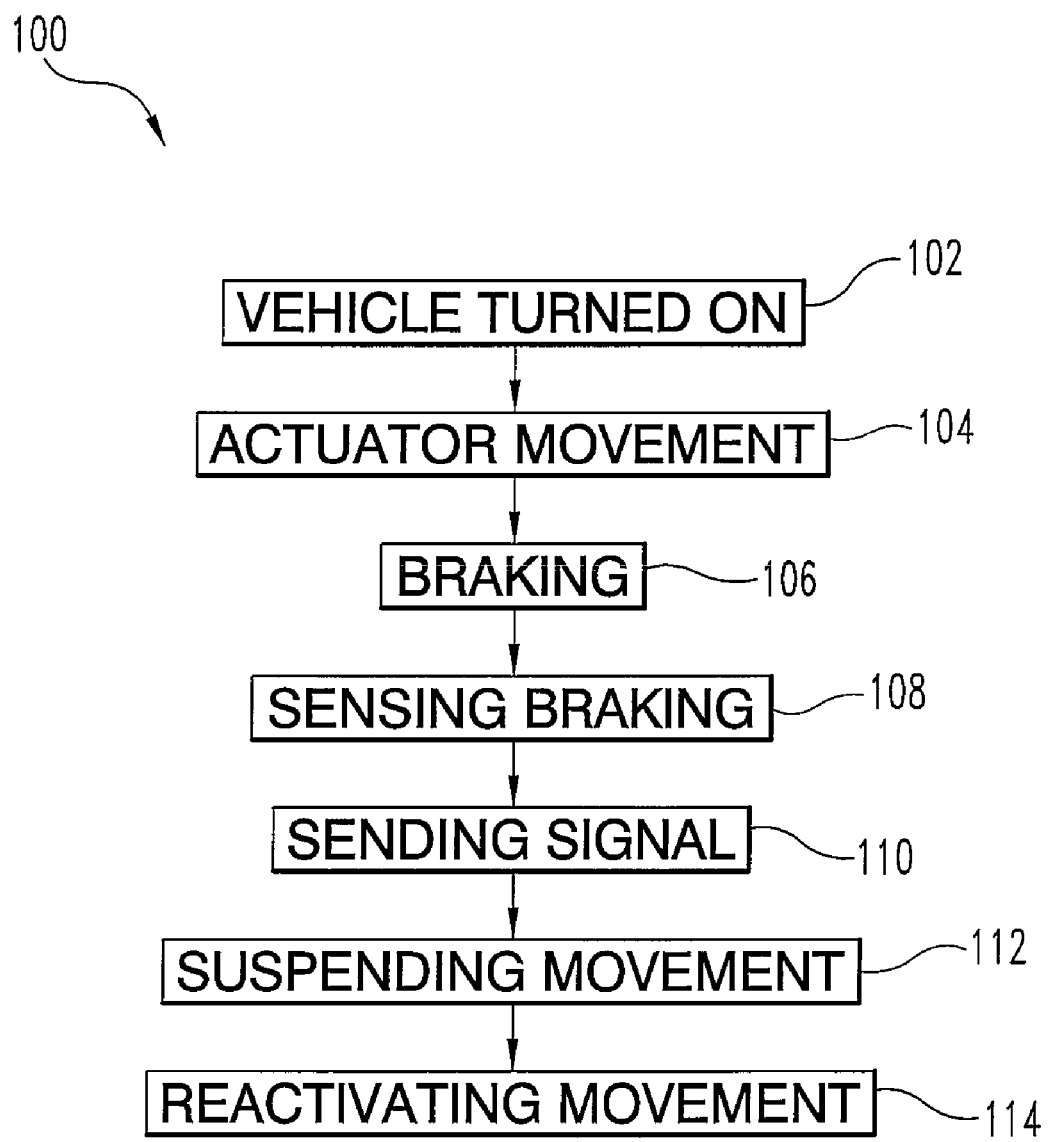
FIG. 1 is a flow diagram of a vehicle seating system according to an embodiment of the present disclosure.

While the present disclosure may be embodied in many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

A system involving at least one actuator for altering the seating position of a vehicle seat, as well as manner of suspending movement of the actuator during critical events, can be used within a variety of vehicles. In certain embodiments, the system includes a signal sent in response to application of the vehicle brakes which directs suspension of movement of the actuator. Such a system may include a typical vehicle seat mountable in a vehicle, at least one powered seat adjustment actuator, and an electrical controller. Various embodiments of the system can be used within automobiles, trains, and/or airplanes, as examples.

The one or more actuators are moveable to alter the seating position formed by the seat, to provide comfort to the user and/or reduce positional fatigue and other effects of long distance traveling. The actuators may be independently activated by a user and/or may be automatically activated by the electrical controller. The system includes a braking sensor associated with the braking system of the vehicle to send a signal to the electrical controller indicating application of the vehicle brakes has occurred. In response, the electrical controller suspends movement of the actuators during application of the vehicle brakes. The term "suspend" includes fully stopping movement as well as significantly slowing or reducing movement, or a combination thereof. In certain embodiments, the electrical controller reactivates automatic movement of the actuators following a programmable delay period occurring after the end of application of the vehicle brakes.

Regarding automatic activation, the actuators reposition the seat to different seating positions with a slow movement average of typically less than about 15 centimeters per second, and often less than about 10 centimeters per second. The electrical controller may have a control period which generally includes at least one movement period and, in certain embodiments, at least one stationary period. In certain embodiments, the electrical controller includes controlling software which may be initially activated by a user at a desired time to begin automatic movement of the actuators. Thereafter, the control period preferably includes at least one movement period where the actuators automatically move to alter the seat position of the seat (through one or more different seating positions) and reposition the user to reduce long distance traveling fatigue.

FIG. 1 illustrates a block diagram of a system 100, the diagram showing various steps or stages of the system. Initially, at step 102 the vehicle is turned on by a vehicle user. Step 104 represents movement of one or more seat adjustment actuators to alter the seating position of the vehicle seat. In certain embodiments, the actuators are activated manually by a vehicle user. In such cases, the user may activate the actuators, typically individually, as desired to provide comfort for the user. In certain other embodiments, the actuators are automatically activated by an electrical controller, which will be discussed in greater detail below with reference to FIGS. 5-20. In such cases, an optional step of triggering a control mechanism which initiates the automatic movement of the actuators may be present between steps 102 and 104. The control mechanism may include a button accessible to the user and linked with software on the electrical controller which controls the automatic movement of the actuators. In alternative embodiments, the automatic activation may be initiated when the vehicle is turned on at step 102.

Figure 2:
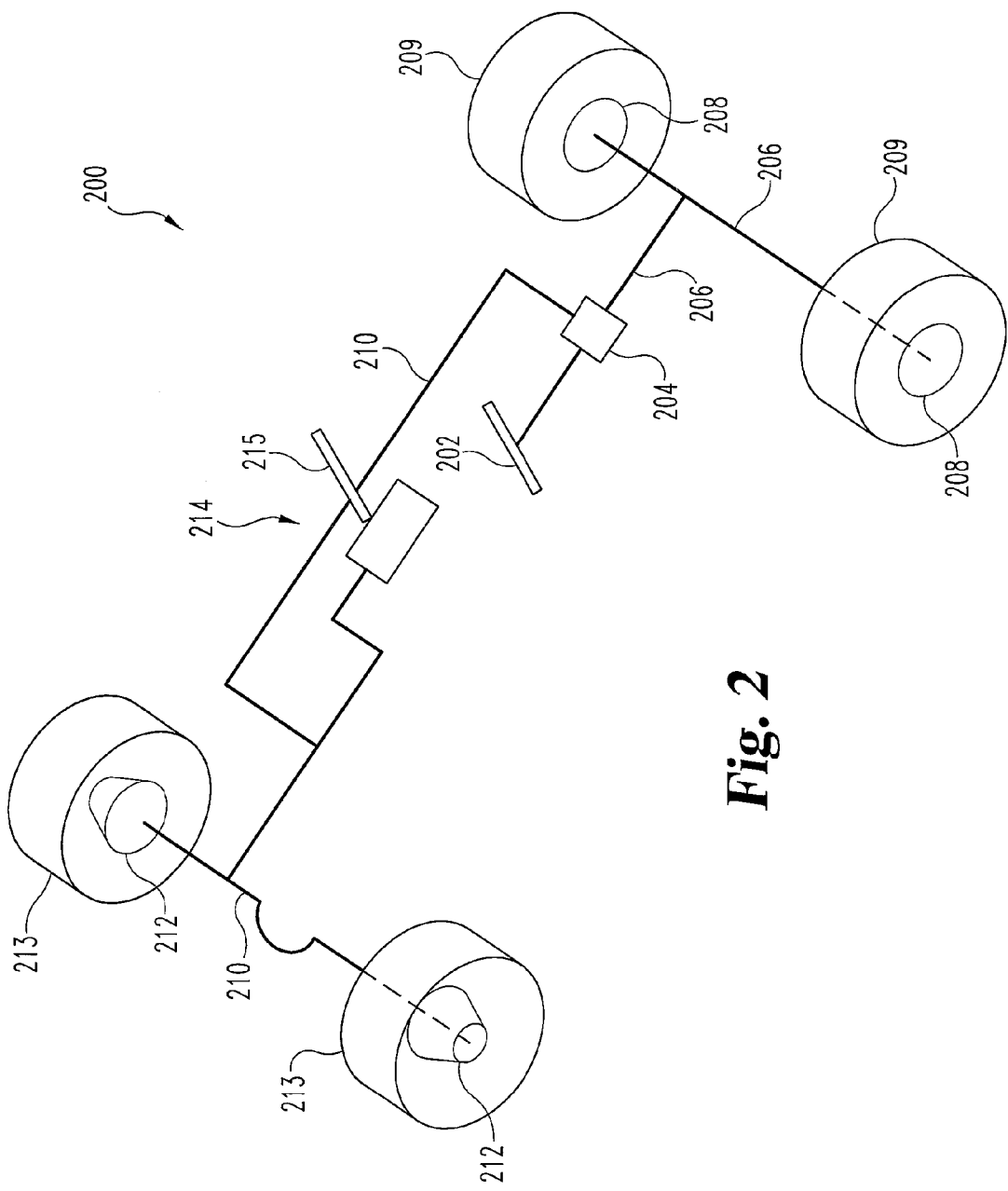
FIG. 2 is a perspective view of an example vehicle braking system.

Step 106 represents a vehicle user activating the vehicle's braking system by at least partially depressing the brake pedal of the vehicle to decelerate the vehicle. Under the present system, this triggering event leads to suspending any movement of the seat adjustment actuators. As an example, FIG. 2 shows a skeleton drawing of a typical vehicle braking system 200 using hydraulics, to better illustrate the operation of system 100. However, it should be appreciated that the present system may be used with many different vehicle braking systems, with system 200 only being one example of numerous possible configurations.

System 200 generally includes a brake pedal 202 leading to a master cylinder 204. Hydraulic lines 206 lead from master cylinder 204 to typical disc brakes 208. Upon activation of vehicle braking system 200, disc brakes 208 operate in a typical fashion to stop the rotation of front wheels 209. Hydraulic line 210 leads from master cylinder 204 to typical drum brakes 212. Upon activation of vehicle braking system 200, drum brakes 212 operate in a typical fashion to stop the rotation of rear wheels 213. Generally, when a user depresses brake pedal 202, cylinder 204 transmits the force hydraulically through the fluid lines, and the brakes transmit the force to the tires using friction to stop rotation of the tires. For illustration purposes only, vehicle braking system 200 is shown with disc brakes associated with the front wheels and drum brakes associated with the rear wheels. It should be appreciated that the types of brakes used with vehicle braking system 200 could be any number of a variety of brakes used with the front and rear wheels.

In certain embodiments, vehicle braking system 200 further includes a typical emergency braking subsystem 214 having an emergency brake handle 215. In the illustrated embodiment, emergency brake handle 215 can be engaged by a user to apply the emergency braking subsystem to rear wheels 213. As with system 200, the illustrated subsystem 214 is only one example of numerous possible configurations of an emergency braking system.

Sensing activation of the vehicle braking system occurs at step 108. In certain embodiments, sensing application of the vehicle brakes involves the use of an actuator or sensor associated with the vehicle braking system to send a signal when the vehicle brakes are applied. It is contemplated that the sensor could be incorporated into the vehicle braking system at a number of different locations. With reference to vehicle braking system 200, the sensor or actuator could be associated with brake pedal 202, master cylinder 204, hydraulic lines 206 and/or 210, disc brakes 208 and/or drum brakes 212. Additionally, in certain embodiments, another actuator or sensor could be associated with emergency braking subsystem 214 to detect application of the emergency brake. As even further examples, the sensor or actuator could be associated with the smaller pistons (not shown) or the brake pads/shoes (not shown) used in connection with the disc and drum brakes.

In other embodiments, the sensor may be an optical sensor used to detect movement of a component of the vehicle braking system. As an example, an optical sensor may be used to detect movement of the brake pedal, such as brake pedal 202, to detect application of the vehicle brakes. In even other embodiments, the sensor may be associated with the brake lighting system of the vehicle, such that activation of the brake lighting system indicates application of the vehicle brakes. In yet other embodiments, the sensor may be a mechanical linkage component to detect application of the vehicle brakes. In such embodiments, the sensor may be engaged with the brake pedal, such that when a user depresses the brake pedal, the mechanical component activates a mechanical linkage system to suspend movement of the actuators. In another version, the sensor may be a computer software algorithm that senses any state in the vehicle's microprocessor(s) that corresponding with braking or deceleration. Such status in the microprocessor(s) may be initiated by one or more of the above-mentioned sensors, as well as vehicle velocity, deceleration, or the like.

In certain embodiments, a sensor or actuator, examples of which are described above, sends a signal at step 110 in response to activation of the vehicle braking system. It is contemplated that the signal could be sent in numerous possible ways. As an example, the signal may be an electrical signal sent from the sensor to an electrical unit which communicates with the actuators. In the example given above in which the sensor is a mechanical component, the signal could be sent via mechanical linkage to suspend movement of the actuators. In such embodiments, the mechanical linkage may be configured to contact a power switch to turn the actuators off. As yet another example, the signal may be sent from the sensor to a controller via a hydraulic pressure mechanism.

In typical embodiments, the signal travels along an electrical line (or by radio frequency) to an electrical controller operable to activate and suspend movement of the seat adjustment actuators. The electrical controller may be integrated into the vehicle's electrical system. In certain embodiments, the electrical controller discussed herein is the central electrical unit of the vehicle. Alternatively, the electrical controller may be an electrical unit designed specifically for activating and controlling the seat adjustment actuators. In certain other embodiments, the signal travels to specific seat adjustment actuators to suspend movement of the actuators.

Figure 3:
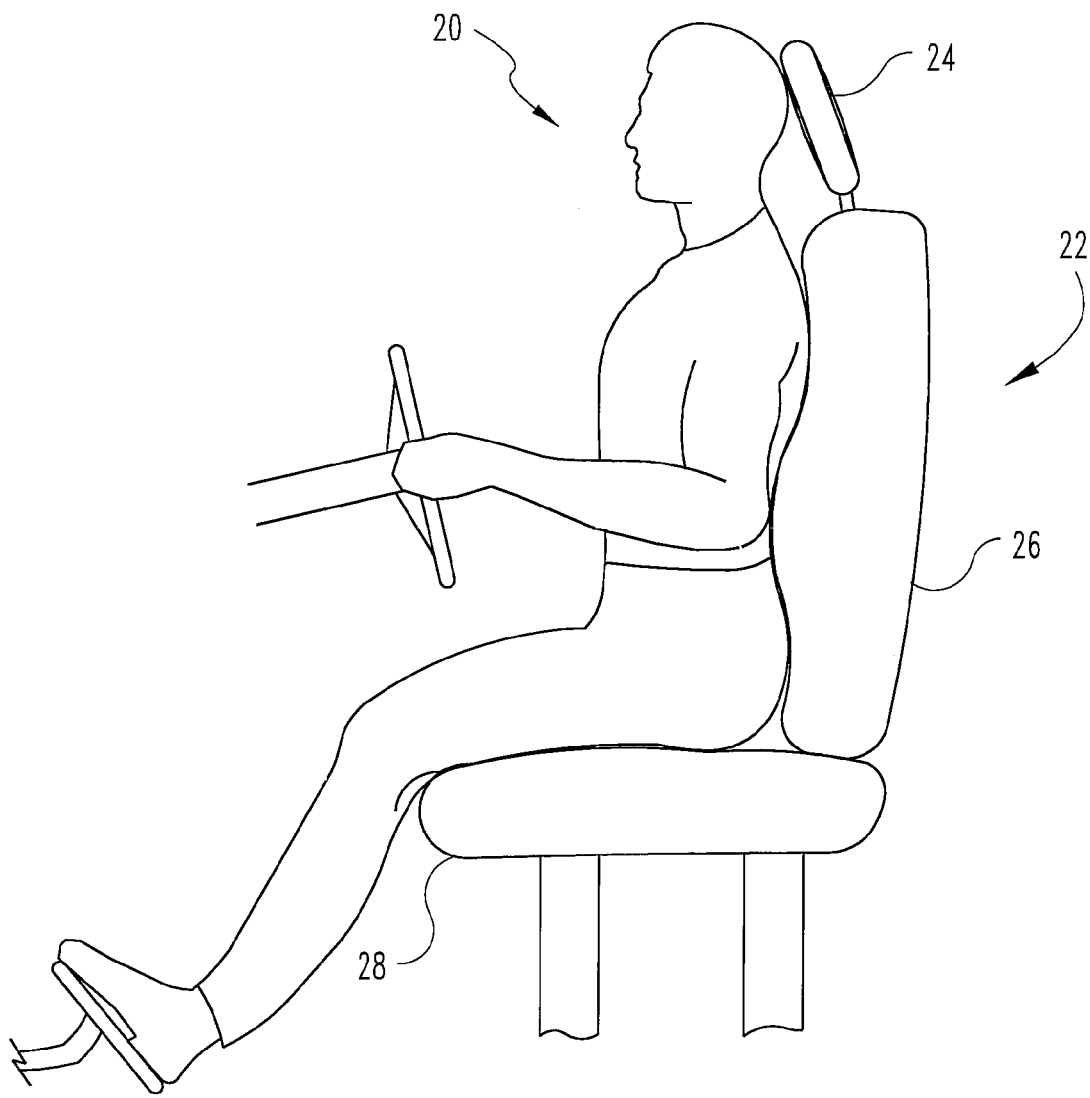
FIG. 3 is a perspective view of a vehicle seat and a user seated therein.
Figure 4:
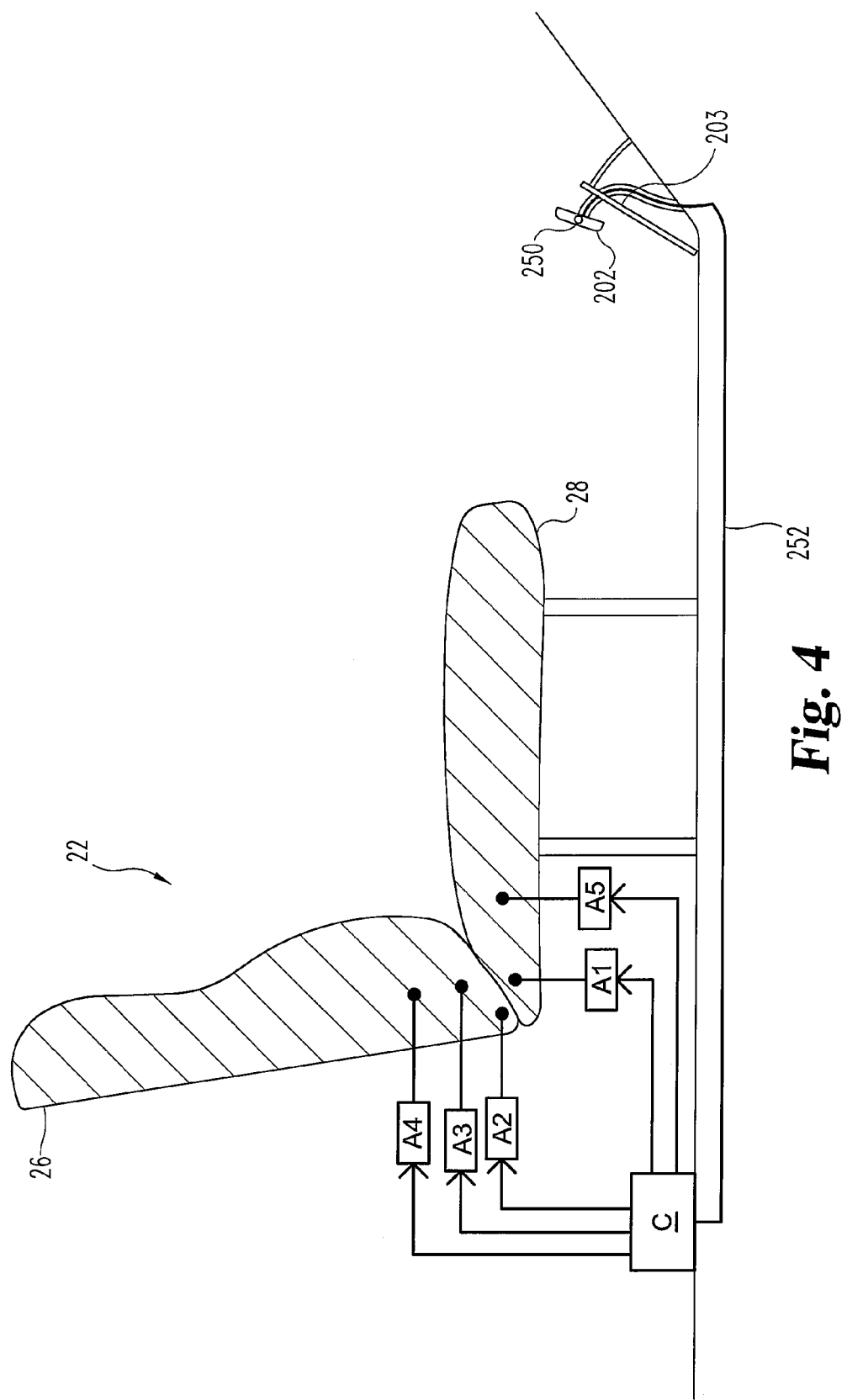
FIG. 4 is a side, partial cross-sectional view of a vehicle seating system embodiment.

Turning to FIGS. 3 and 4, an example implementation of step 110 is shown, with the sensor positioned on the brake pedal of the vehicle to detect a user applying pressure to the brake pedal to activate the vehicle's braking system, and sending an electrical signal to an electric controller in response thereto. For general overview purposes, FIG. 3 illustrates a vehicle user 20 seated in a vehicular seat 22. A typical vehicular seat includes a head rest 24, a seat back 26, and a seat bottom 28. As illustrated in FIG. 3, the user is operating a motor vehicle by using a typical steering wheel and pedal system. Additionally, the motor vehicle may include a typical vehicle braking system, such as system 200 as an example.

FIG. 4 illustrates an embodiment of the present system in which vehicular seat 22 includes various seat adjustment actuators. The illustrated actuators A1-A5 may be automatically activated by electrical controller C to alter the seating position formed by seat 22 to reduce user positional fatigue, as will be explained in greater detail below. Additionally, FIG. 4 illustrates brake pedal 202, adjacent a gas pedal 203, to activate vehicle braking system 200 (see FIG. 2). In the illustrated embodiment, a sensor 250 is positioned on brake pedal 202 and designed to produce an electrical signal in response to a user depressing brake pedal 203 to decelerate the vehicle. In such embodiments, the electrical signal travels along electrical line 252 to electrical controller C to suspend movement of the actuators during the critical event of braking. It should be appreciated that the example shown in FIG. 4 is merely one example of many different possible configurations for sending a signal in connection with step 110.

Movement of the actuators is suspended at step 112 in response to application of the vehicle brakes, as discussed above. In typical embodiments, an electrical signal is sent to the electrical controller, as described above in connection with step 110, which directs the electrical controller to suspend movement of the actuators. However, other embodiments are contemplated, such as a mechanical linkage system or a hydraulic pressure system, as mentioned above, implemented to stop or redirect power sent to the actuators.

In accordance with the typical embodiment, electrical controller C may be encoded with logic executable to suspend movement of the actuators for a hibernation period upon receiving the electrical signal. In certain embodiments, the electrical controller suspends movement of the actuators during the time that the vehicle brakes are applied. The electrical controller may suspend movement of the actuators for an additional delay period after a vehicle user removes any foot pressure from the brake pedal. As an example, the delay period may be at least a few seconds, and normally at least 10 seconds after a user lets off the brake pedal. In a specific embodiment, the electrical controller suspends movement of the actuators during application of the vehicle brakes and for an additional delay period of about 15 seconds after the end of application of the vehicle brakes. The delay period may be longer or shorter. As another example, the delay period may be at least 1 minute after a user lets off the brake pedal. In even other embodiments, the electrical controller may suspend movement of the actuators until the user of the system reactivates the actuator movement. The vehicle seat occupies a temporary suspended position during the hibernation period corresponding to the positions of the actuators when movement is suspended. Following the suspension of movement, the actuators may be available for further independent movement by a user, or the electrical controller may reactivate automatic movement of the actuators as discussed below in connection with optional step 114.

Optionally, the electrical controller may be encoded with logic executable to reactivate automatic movement of the seat adjustment actuators at step 114. In certain embodiments, the actuators are automatically activated to move in accordance with a predetermined routine, and may be suspended in response to a critical event such as vehicle breaking, as described above. In such situations, the electrical controller may reactive movement of the actuators following the critical event and continue with the same predetermined routine from the point where the routine was suspended. In other words, the vehicle seat may be said to have obtained a temporary suspended position when the suspension of movement of the actuators occurs, with the electrical controller being operable to reactive movement of the actuators beginning from the temporary position. In certain other embodiments, the electrical controller may reactive movement of the actuators following the critical event to return the seat to a base or home position. As described above, in certain embodiments the electrical controller may reactivate movement of the actuators following a delay period after a user lets off the brake pedal (and thus de-activates the vehicle braking system). In other embodiments, the electrical controller may reactivate movement of the actuators immediately after a user lets off the brake pedal, with the delay period being absent.

In alternative embodiments, the electrical controller may only reactive movement of the actuators upon activation by a user of the system. Accordingly, the automatic movement of the actuators may be suspended until such time as a user of the system activates a triggering mechanism to re-start automatic movement of the actuators. Such embodiments may be associated with certain vehicle events such as air bag deployment. It is also contemplated that the system may provide for both automatic reactivation of the actuators as well as user reactivation of the actuators depending on the type of critical event which the vehicle experiences. As an example, braking alone may trigger automatic reactivation by the electrical controller, while air bag deployment may trigger suspension of actuator movement requiring user reactivation.

Another system according to the present disclosure (not diagrammed for simplicity) contemplates the electrical controller being operable to take notice of the activation status of the vehicle braking system to determine if suspension of movement of the actuators is required. In such cases, the electrical controller may use electrical signals proactively to determine if the brake pedal is depressed and accordingly suspend movement when necessary. In certain embodiments, the electrical controller may assess the activation status of the vehicle braking system before each predetermined routine begins and/or before each movement of an actuator within a predetermined routine. The system of proactively determining the activation status of the vehicle braking system can be implemented in addition to system 100, such that the two systems work together to suspend movement of the actuators during critical events the vehicle may undergo.

Figure 5:
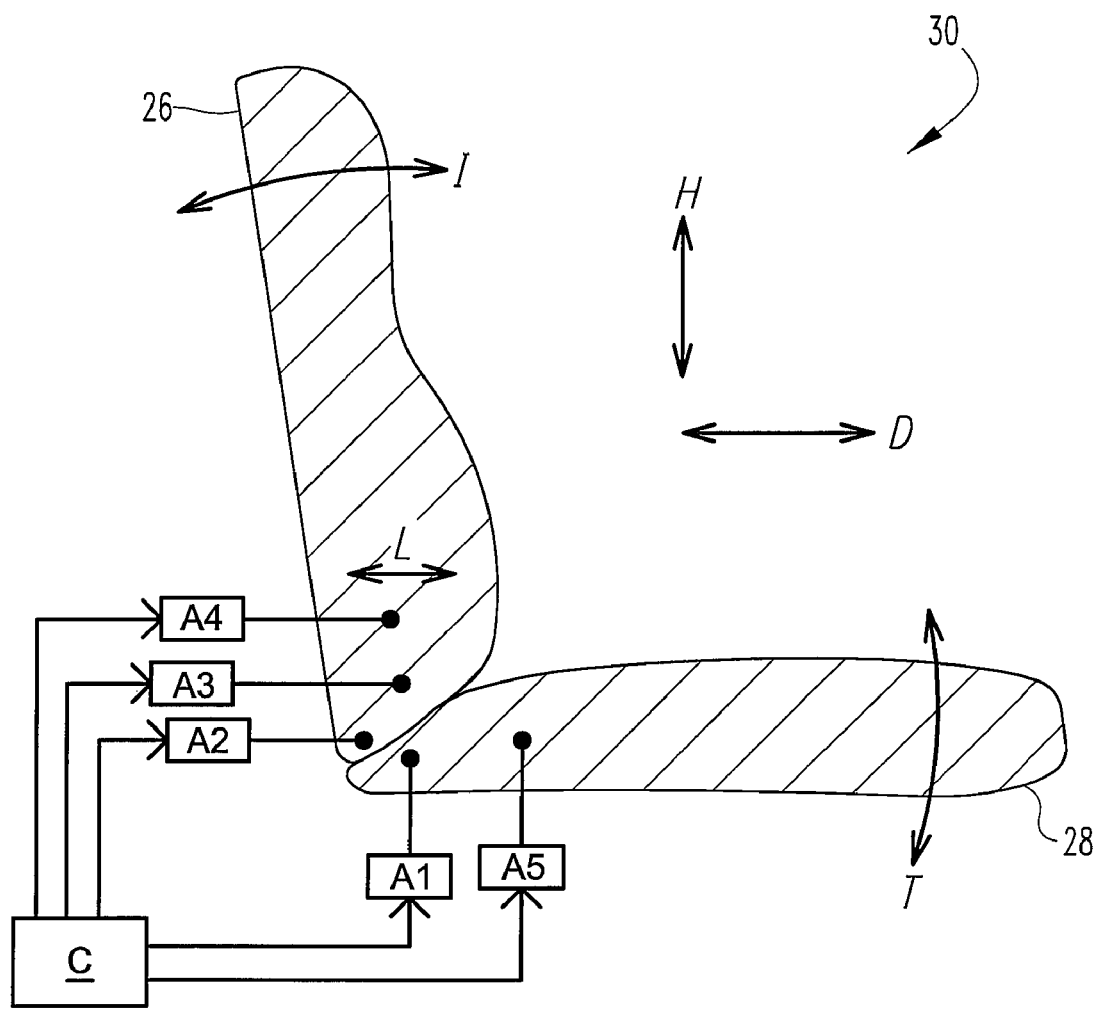
FIG. 5 is a side, partial cross-sectional view of a vehicle seating system embodiment.

Turning again to step 104, embodiments involving the automatic activation of the seat position adjustment actuators by an electrical controller will be discussed with reference to FIGS. 5-20. FIG. 5 illustrates components of a vehicle seating system 30 designed to reduce user positional fatigue. It should be appreciated that the system can be associated with any type of vehicular seat. System 30 includes various powered seat adjustment actuators configured to move seat back 26 and seat bottom 28 in various manners, thereby altering the seating position formed by the seat. Certain typical embodiments include five actuators, such as a first actuator A1 to move both the seat back and the seat bottom in a generally vertical direction along a height axis H and a second actuator A2 to move both the seat back and the seat bottom in a generally horizontal direction along distance axis D. Movement along the distance axis D alters the distance that the seat is positioned relative to a steering wheel and pedal system for a driver's seat. A third actuator A3 is configured to move a lumbar region of the seat back along a lumbar axis L. A fourth actuator A4 and a fifth actuator A5 operate to incline or tilt the seat back along an I axis and the seat bottom along a T axis, respectively. The actuator power may be by motor, servo motor, stepper motor, pneumatics, hydraulics, or otherwise.

In certain embodiments, movement of the actuators includes a slow movement average of less than about 15 centimeters per second. In some embodiments, movement may be at a slow movement average of less than about 10 centimeters per second. In certain embodiments, each actuator moves from a first position to a second position, and cycling of the actuators includes movement from the first positions to the second positions and returning to the first positions. In some embodiments, the actuators occupy third and consecutive positions before returning to the first positions. In certain embodiments, the first position of each actuator is a base position and the second position of each actuator is the opposite, completely extended position of each actuator along the respective axis. However, in certain other embodiments, the first position of each actuator is a desired position, predetermined by the system or a user of the system.

System 30 generally includes an electrical controller C to automatically activate, operate, and cycle through the various actuators in a manner as to reduce positional fatigue. The electrical controller may operate in conjunction with a microprocessor and/or computer chip technology to operate the system. Additionally, the electrical controller may operate in conjunction with software technology to control automatic movement of the actuators. The electrical controller may include a control period. In certain embodiments, a user of the system may trigger a control mechanism to initiate the control period (and thus initiate automatic movement of the actuators) at a time desired by the user. In certain other embodiments, the electrical controller initiates the control period when the vehicle is turned on. In such cases, the control period may optionally include a first stationary time period before movement begins. In yet other embodiments, the electrical controller initiates the control period after passage of a first stationary time period beginning when the vehicle is turned on. In certain preferred embodiments, the first stationary period is about 20 minutes. In other preferred embodiments, the first stationary period is about 30 minutes. Further, it is contemplated that the control period can begin at other appropriate times as would generally occur to one skilled in the art.

In certain embodiments, the control period includes at least one fatigue period of at least ten minutes. In a preferred embodiment, the fatigue period includes at least one segment of time in which at least one actuator is moving to reposition the vehicle seat. In certain embodiments, the control period includes at least one movement period, including movement of at least one actuator, and optionally may include at least one stationary period in which the actuators are motionless. In certain embodiments, the stationary period is at least 5 minutes in duration. In certain embodiments, the control period ends when the vehicle is turned off.

As stated above, the electrical controller may be the central electrical unit of the vehicle's electrical system. In such situations, the electrical controller may be turned on when the vehicle is turned on, with a user of the system separately activating the controlling software, to initiate automatic movement of the actuators at a time desired by the user, by triggering a control mechanism linked with the electrical controller and the software. As an example, the control mechanism may include a button positioned on the vehicle's steering wheel or dash board area so that a user may activate and de-activate the automatic movement as desired. In other embodiments, the electrical controller may be a separate electrical component from the vehicle's central electrical unit, although electrically integrated into the vehicle's electrical system. In such cases, the electrical controller may be activated automatically when the vehicle is turned on and/or may be manually activated and de-activated by a user of the system. In the latter situation, a user of the system may manually switch the electrical controller on and off as desired. Additionally, in certain embodiments, the electrical controller is de-activated when the vehicle is turned off.

Figure 6:
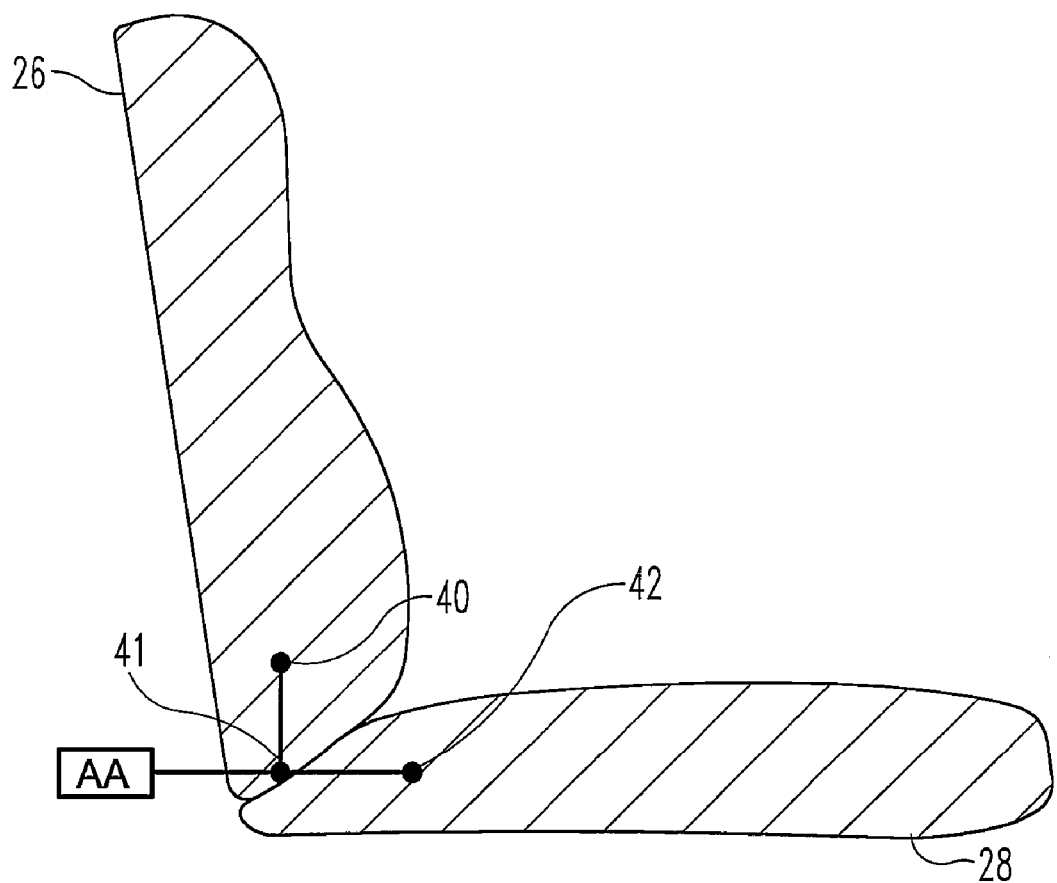
FIG. 6 is a side, partial cross-sectional view of a vehicle seating system embodiment.

FIG. 6 illustrates an alternative embodiment in which one actuating means AA, such as one power cylinder, is used to move the seat back and seat bottom to various seating positions through the use of various mechanical linkages such as bell cranks, worm gears, cams, etc. The actuating means AA and the mechanical linkages can be configured to cause movement at different actuating points, such as actuating points 40, 41, and 42, through the use of one actuating means. In other words, there may be one actuating means and more than one actuator at points 40, 41, and 42, for example. It is possible to link the actuators, as shown in FIG. 6; however, in is often typical that the actuators operate independent of each other, as in FIG. 5.

FIGS. 7-17 are graphic illustrations of various embodiments of a vehicle seating system to adjust the position of the vehicle seat. The figures illustrate movement of various actuators along a horizontal Time axis and a vertical Movement axis. The Movement axes generally include a "1" denoting a first position and a "2" denoting a second position, and certain figures include delineations along the Movement axes denoting partial movement between the first and second positions. It should be appreciated that the first and second positions can be various combinations of actuators and activation position levels thereof, and can be randomly chosen or predetermined by the system or a user of the system. They could be full stroke or partial stroke (or rotation) of the actuators. In certain embodiments, the transition time for the actuators to move from the first positions to the second positions is in the range of 20-40 seconds.

FIGS. 7-17 represent only a few of numerous embodiments of actuator movement profiles of a vehicle seating system as described herein. In the illustrated embodiments, optionally a first time period passes before movement on Movement Axis M between positions 1 and 2 of one or more actuators begins. In certain embodiments, the initial movement of one or more actuators is the beginning of the control period. In certain other embodiments, the control period includes an initial period of time of inaction of the actuators. In other words, in certain embodiments the Time axis T begins with the vehicle turning on, and in certain other embodiments, the Time axis T begins with the beginning of the control period. Further, the illustrated embodiments are not meant to be limiting in any manner, including regarding the number of actuators illustrated in the figures. It should be appreciated that the embodiments illustrated in the figures can include movement of a different number of actuators as would occur to one skilled in the art. Also, although the movement profiles illustrated in FIGS. 7-17 are linear segments, they may optionally include curvilinear segments as well. In certain embodiments, the actuators move with a slow movement speed average of less than about 15 centimeters per second. In some embodiments, the actuators move with a slow movement speed average of less than about 10 centimeters per second. Additionally, it should be appreciated that the activity of the actuators illustrated in the figures can continue indefinitely along the Time axis, with only a segment of the activity shown for clarity. Also, any and all of the profiles in FIGS. 7-17 and otherwise may be combined with each other.

Figure 7:
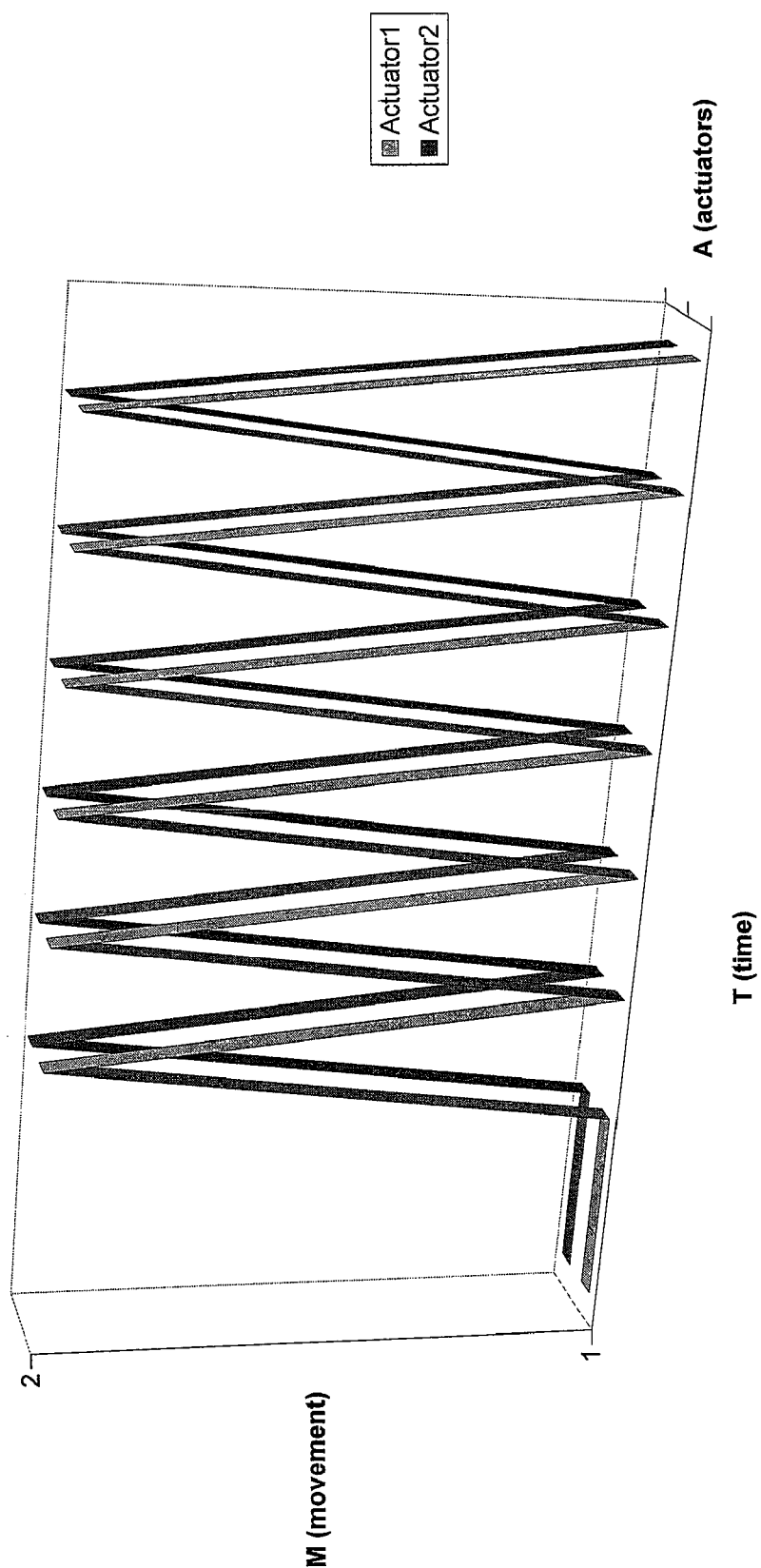
FIGS. 7-17 are graphic illustrations of various examples of movement profiles of a vehicle seating system.

The control period illustrated in FIG. 7 includes one continuous movement period, wherein at least one actuator is moving through different seating positions. FIG. 7 illustrates two such actuators; however, it should be appreciated that a different number of actuators can reposition the seat during the movement period. The movement period illustrated in FIG. 7 includes cycling of the various actuators from first positions to second positions continually until the control period ends. In certain embodiments, the movement period illustrated in FIG. 7 includes movement of at least two seat adjustment actuators.

Figure 8:
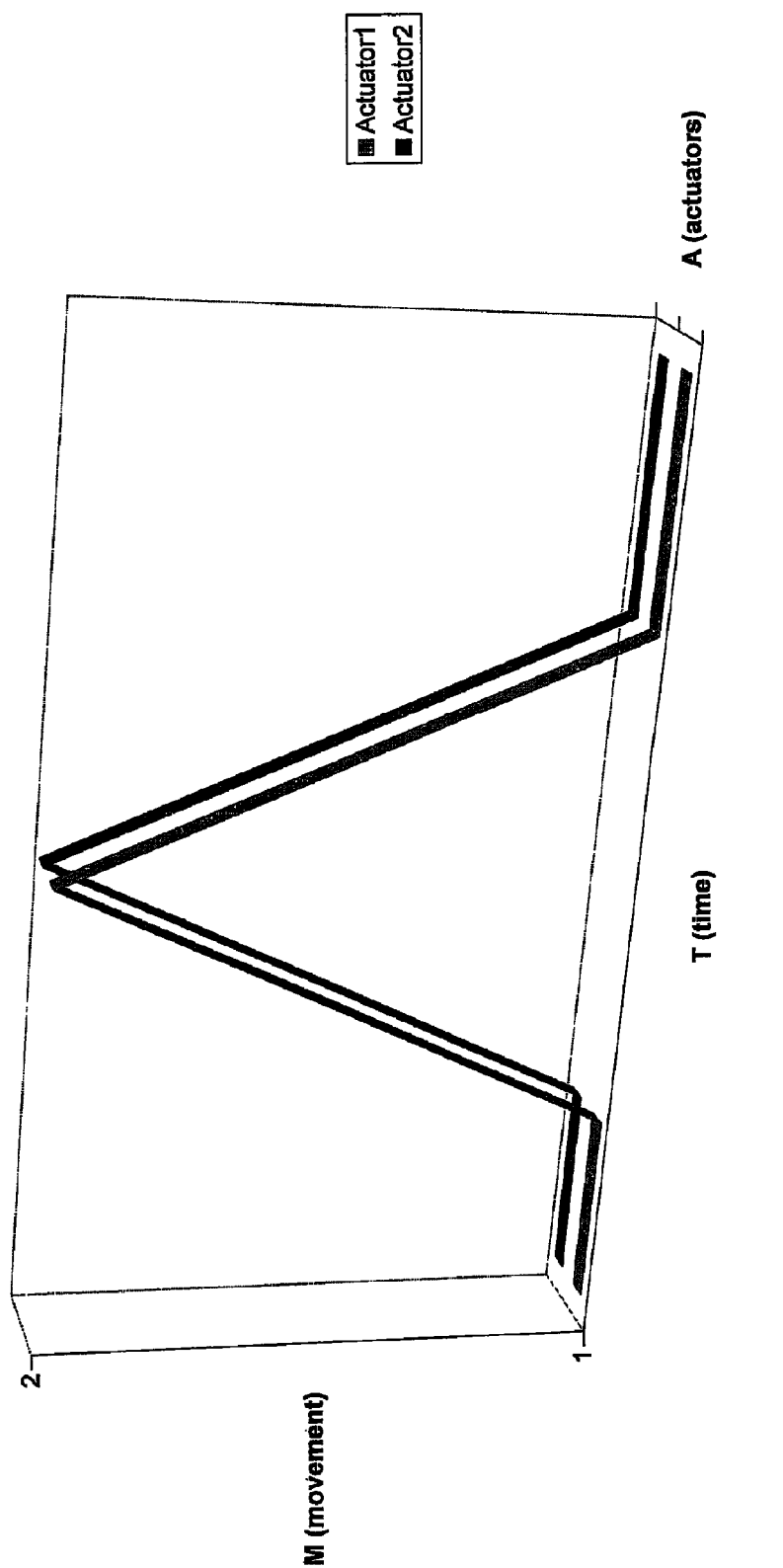

FIG. 8 is a graphic illustration of another possible embodiment of a vehicle seating system. In the embodiment illustrated in FIG. 8, the control period includes a movement period followed by a stationary period of inaction of the actuators. It should be appreciated that this movement period and stationary period alternating combination can continue along the Time axis. The illustrated movement period includes cycling of the actuators from respective first positions to second positions, and returning to the first positions. The embodiment illustrated in FIG. 8 includes relatively slow cycling of the actuators to reduce positional fatigue of a user without significant disruption to the user.

Figure 9:
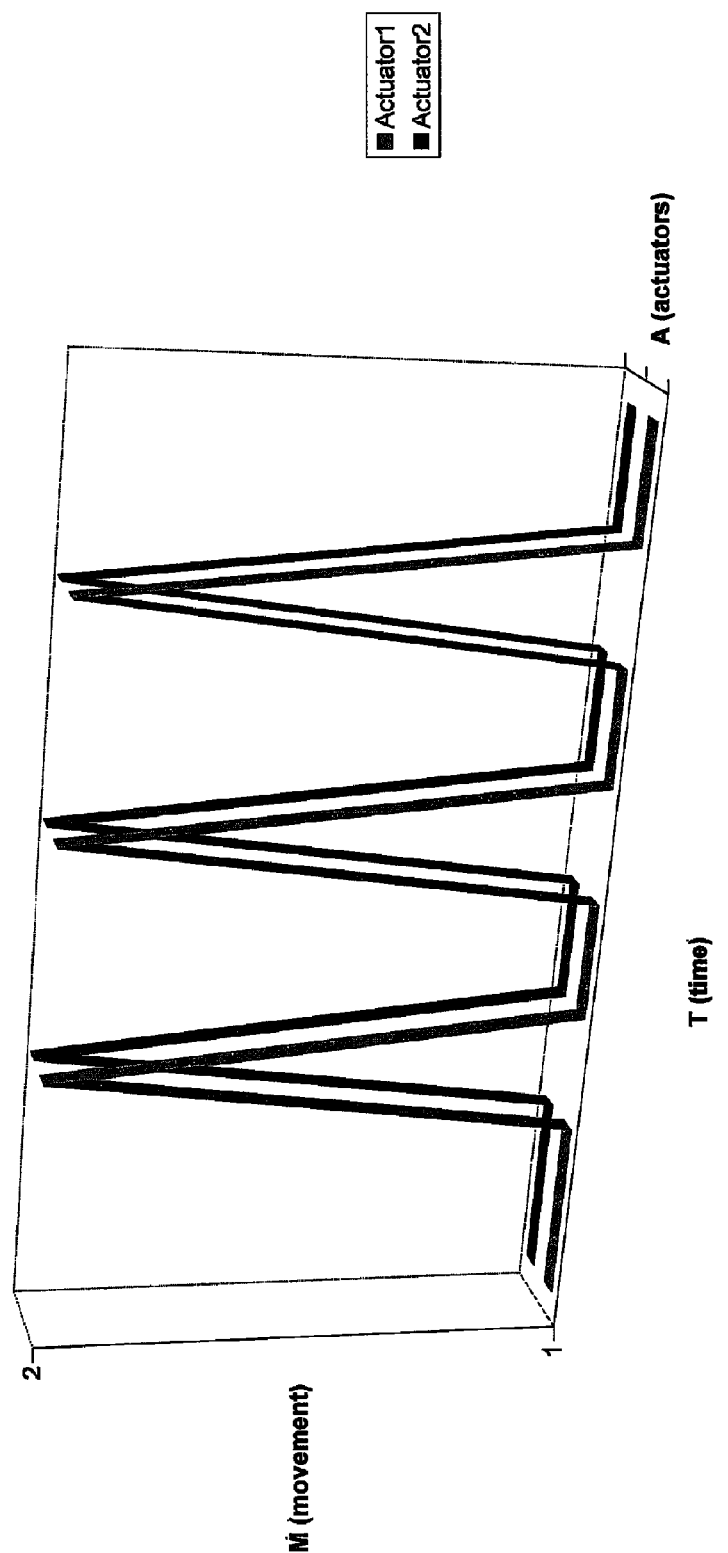

In the embodiment illustrated in FIG. 9, the control period includes alternating movement periods and stationary periods. In certain preferred embodiments, each movement period includes cycling of the actuators from first positions to second positions and returning to first positions. In such embodiments, each stationary period includes static positioning of the actuators at the first positions. However, it should be appreciated that, in certain alternative embodiments, a movement period can include movement of the actuators from first positions to second positions, and a next consecutive movement period can include movement of the actuators from second positions to first positions, with such a continuing alternating pattern. Additionally, in certain alternative embodiments, the movement periods can include other segments of the cycling from first positions to second positions, with stationary periods occurring therebetween.

Figure 10:
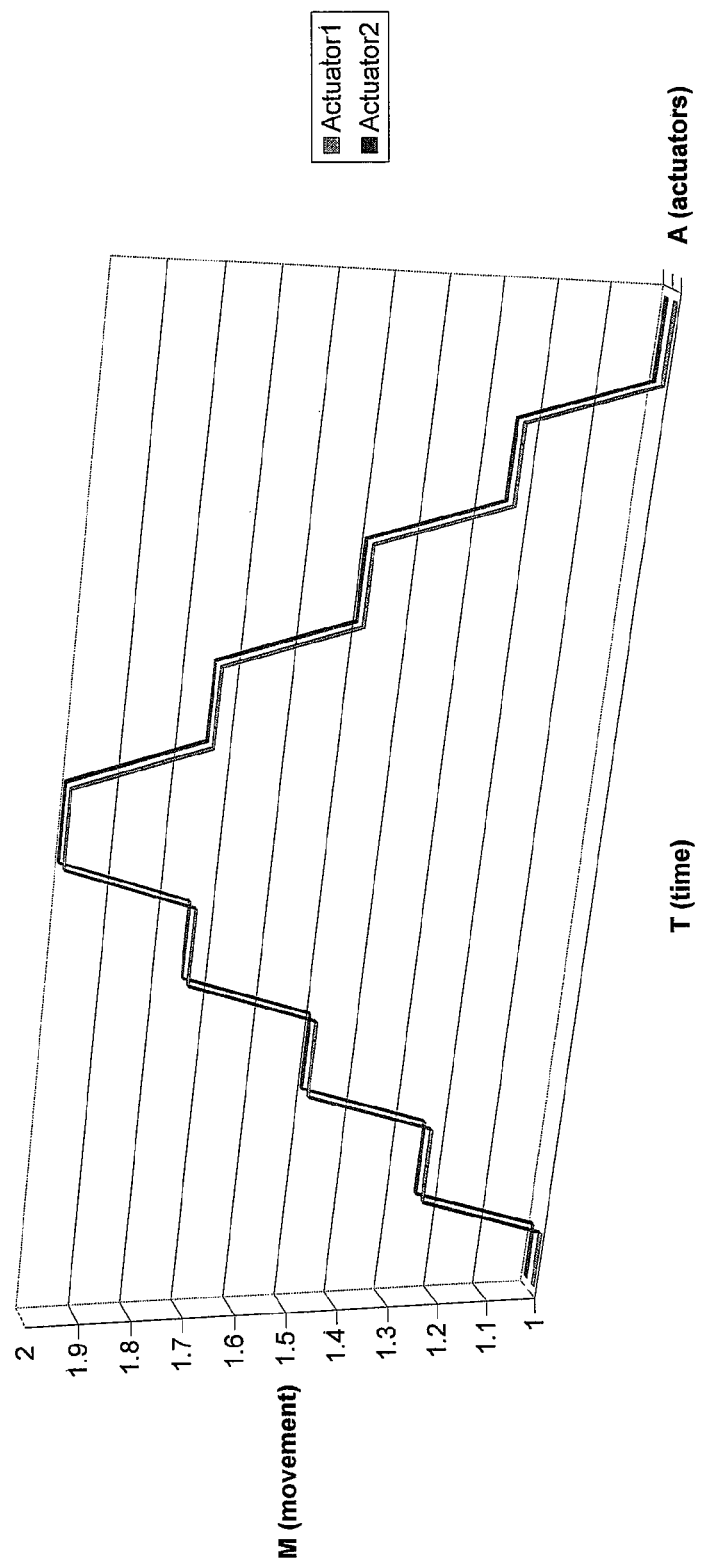

FIG. 10 is a graphic illustration of yet another possible embodiment of a vehicle seating system. In the embodiment illustrated in FIG. 10, the control period includes alternating movement periods and stationary periods. In certain embodiments, each movement period includes slight movement of at least one actuator along a segment of the distance between the first and second positions. The movement periods begin with the at least one actuator moving from a first position toward a second position, reaching the second position and then returning toward a first position, with stationary periods occurring throughout. In certain embodiments, the stationary periods are longer in duration than the movement periods, as illustrated. In the illustrated embodiment, the movement periods include movement equivalent to a quarter segment of the distance between the first and second positions. However, it should be appreciated that the movement periods can include different length segments as would occur to one skilled in the art, including different lengths than the illustrated embodiment and/or different lengths within the same control period for different movement periods. It is also contemplated that movement of one or more other actuators occurs when the illustrated actuators are stationary. In such cases, one or more actuators move and then are stationary, and then one or more other actuators move while the first set of actuators are stationary.

Figure 11:
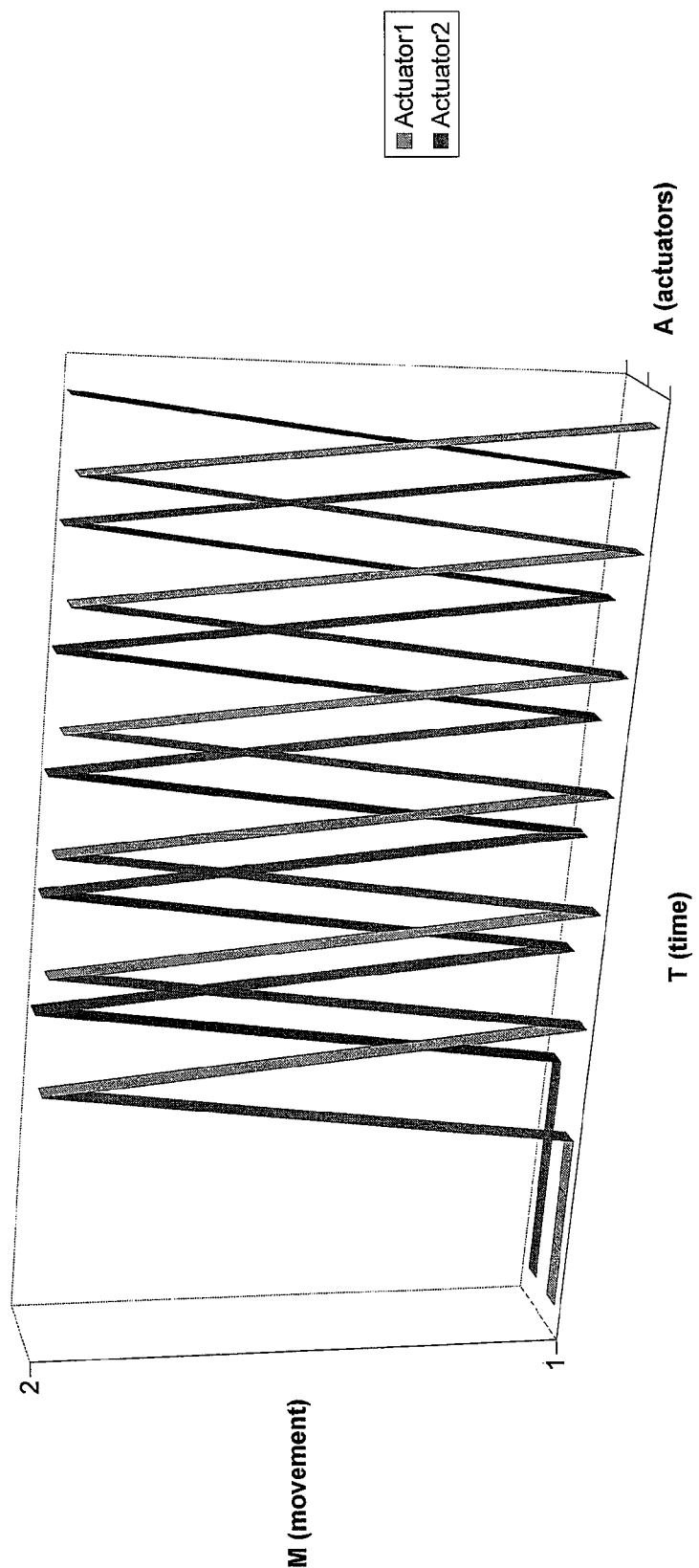

In the embodiment illustrated in FIG. 11, the control period includes one continuous movement period, wherein the actuators are moving through different seating positions, with one actuator moving before another. FIG. 11 illustrates two such actuators; however, it should be appreciated that a different number of actuators can reposition the seat during the movement period. The movement period illustrated in FIG. 11 includes cycling of the various actuators from first positions to second positions continually until the control period ends. In some embodiments, the actuators move such that certain actuators reach first positions when various other actuators reach second positions, and vice versa. In certain embodiments, the movement period illustrated in FIG. 11 includes movement of at least two seat adjustment actuators.

Figure 12:
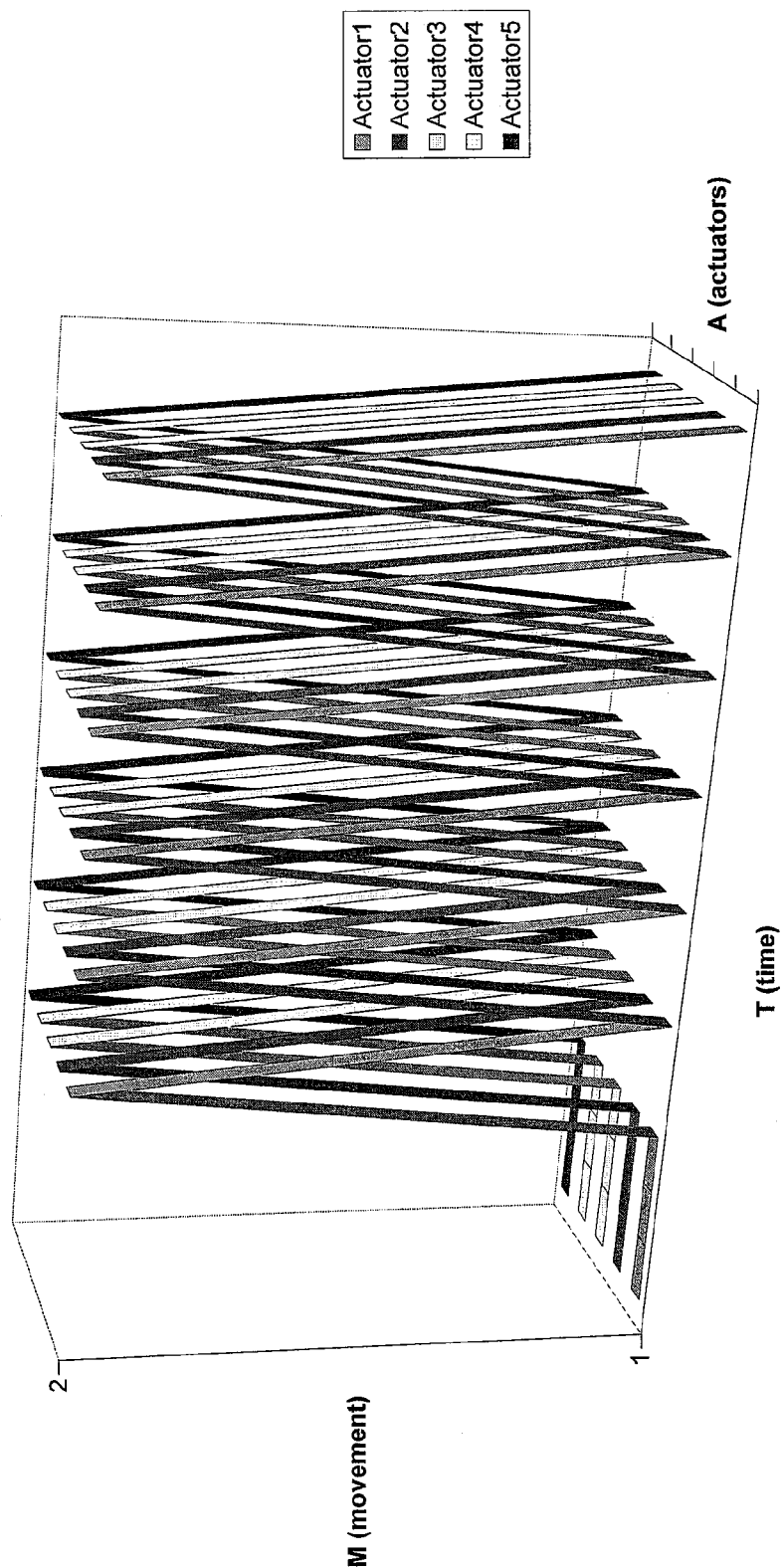

FIG. 12 is a graphic illustration of even another possible embodiment of a vehicle seating system. The control period illustrated in FIG. 12 includes one continuous movement period, wherein the actuators are moving simultaneously through different seating positions. In certain embodiments, the five actuators illustrated in FIG. 12 are the five actuators described in connection with FIG. 5. The movement period illustrated in FIG. 12 includes cycling of the various actuators from first positions to second positions, and back to first positions, continually until the control period ends and with a relatively slow movement average.

Figure 13:
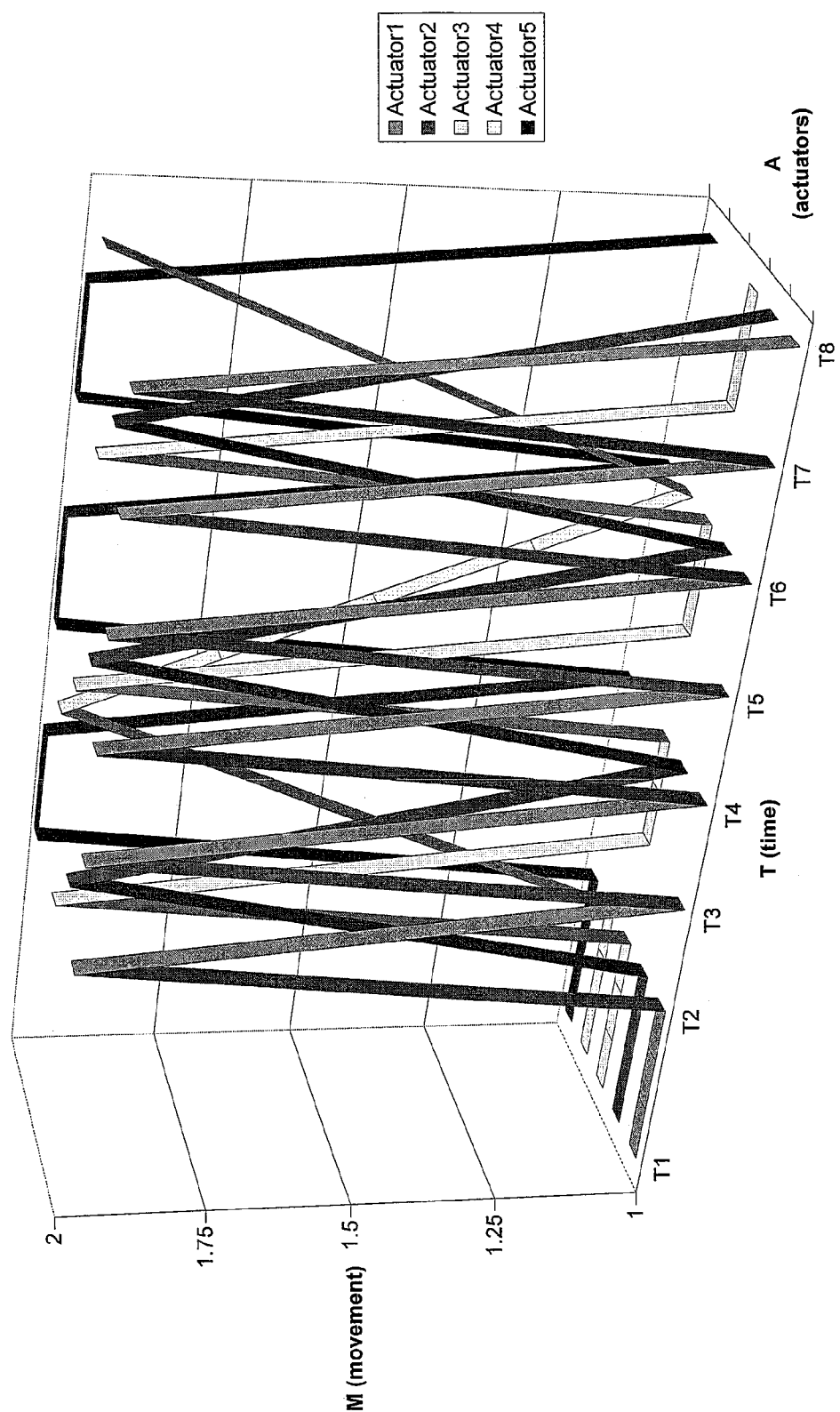

In the embodiment illustrated in FIG. 13, the control period includes various combinations of movement periods and stationary periods, wherein the actuators are moving through different seating positions. The movement period illustrated in FIG. 13 includes cycling of the various actuators from first positions to second positions, with some actuators having stationary periods at certain positions. FIG. 13 is illustrative of the possibility of the various actuators being activated to move at different speeds, and with different combinations of movement periods and stationary periods. Additionally, in certain embodiments, a user can preprogram various desired seating positions to be cycled through. It is contemplated that a user may set each actuator to a desired position, with the actuators collectively defining a preprogrammed seating position. In other embodiments, the seating positions are chosen at random by the system.

FIG. 13 illustrates times T1 through T8. In certain embodiments, the vehicle is turned on at time T1, with electrical controller C being activated and initiating a control period at time T1. In the illustrated embodiment, a first stationary period occurs from time T1 to time T2, in which the actuators remain motionless at position 1, and movement periods begin at time T2. During the movement periods, the actuators cycle at various speeds and through various positions. In the illustrated embodiment, for example, actuator 1 cycles continuously through a single movement period from time T2 to T8, while actuator 5 includes alternating movement periods and stationary periods. Additionally, as a possible example, from time T2 to time T3, actuator 1 cycles from position 1 to position 2 and back to position 1, while actuator 5 cycles from position 1 to position 2 relatively quickly and then remains at position 2 through time T3. Actuator 5 then returns relatively quickly to position 1 at time T4, with this pattern continuing through the movement periods and stationary periods. However, it should be appreciated that other patterns can be implemented for the actuators as would occur to one skilled in the art and/or as desired by a user of the system. Additionally, it should be appreciated that the various movement patterns of the actuators can be randomly chosen by the vehicle seating system or can be pre-programmed by a user of the system. For brevity, the discussion of a control period including times T1 through T8, and the examples discussed herein, have been provided in conjunction with FIG. 13, but similarly apply to FIGS. 7-17.

Figure 14:
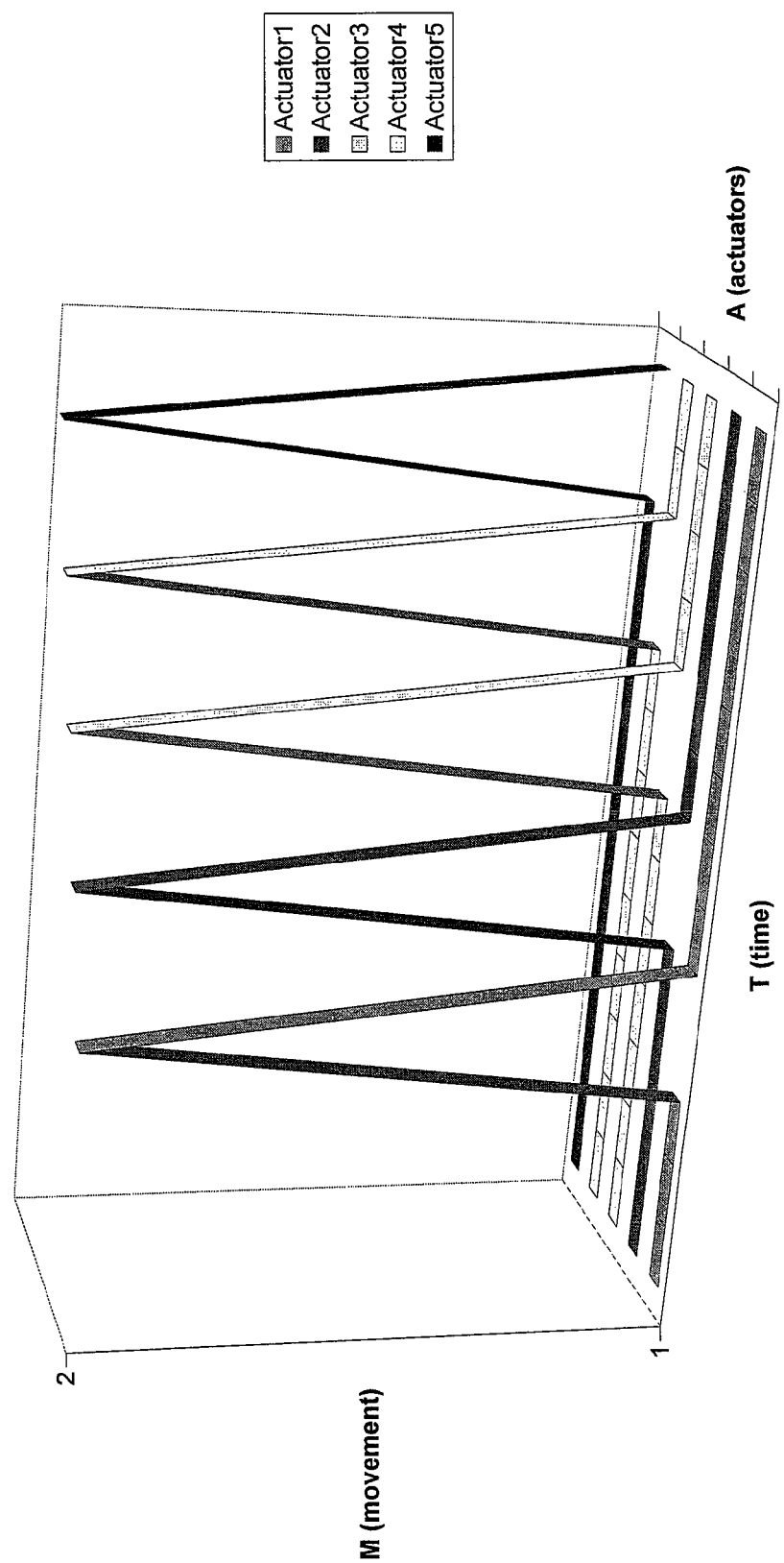

FIG. 14 is a graphic illustration of another possible embodiment of a vehicle seating system. The control period illustrated in FIG. 14 includes movement periods in which only one actuator is cycling through seating positions at a time. In certain embodiments, a first actuator cycles from a first position to a second position and back to a first position, with other actuators then following the same pattern. In such embodiments, each actuator includes periods of inactivity, with the overall control period including one continuous movement period with only one actuator cycling at a time.

Figure 15:
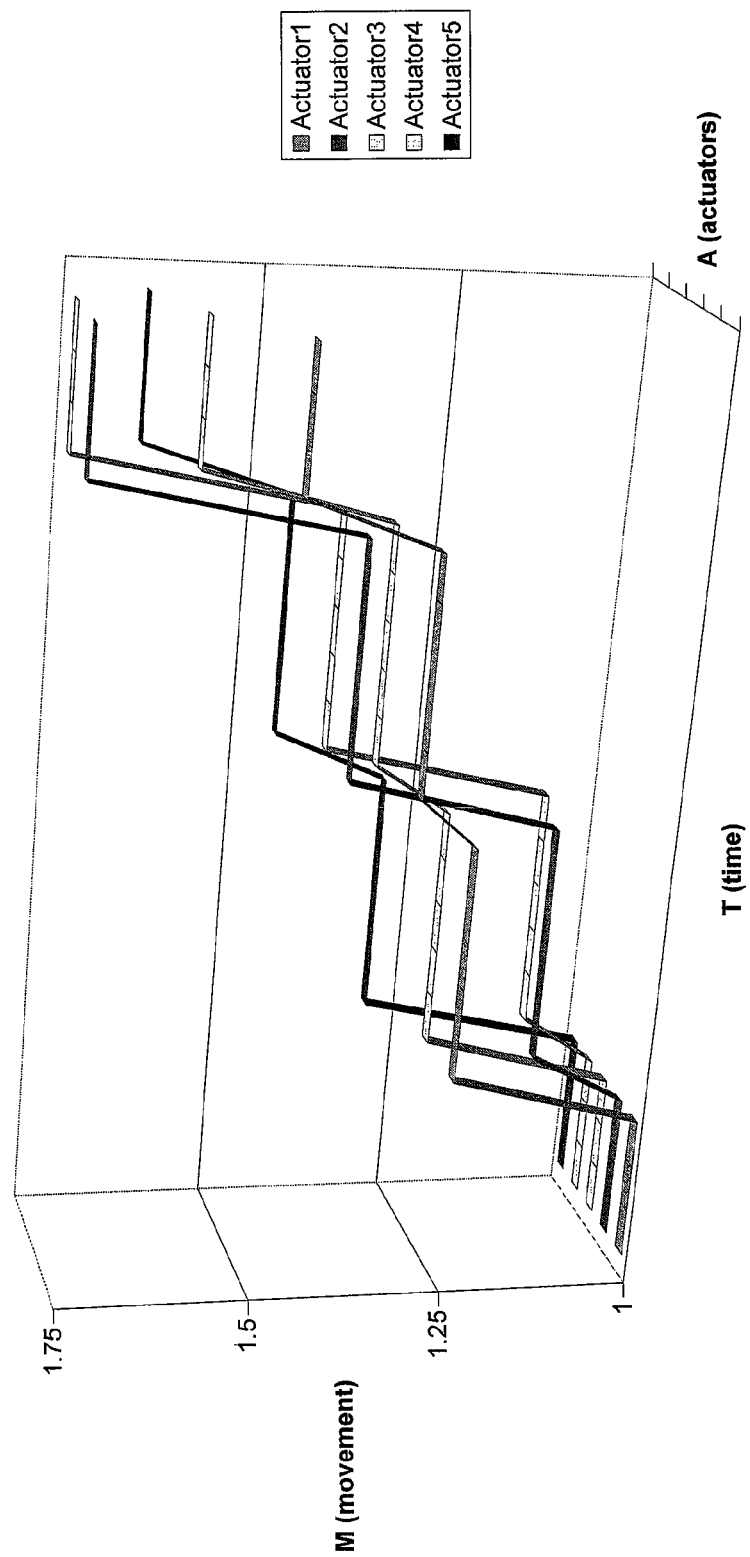

In the embodiment illustrated in FIG. 15, the control period includes alternating movement periods and stationary periods. The movement periods include movement of the actuators to specified predetermined positions, with stationary periods occurring therebetween. In certain preferred embodiments, a user of the system pre-selects one or more seating positions using a combination of positions of the actuators. In such embodiments, the movement periods cycle the actuators to the pre-selected seating positions with a slow movement average over the control period.

Figure 16:
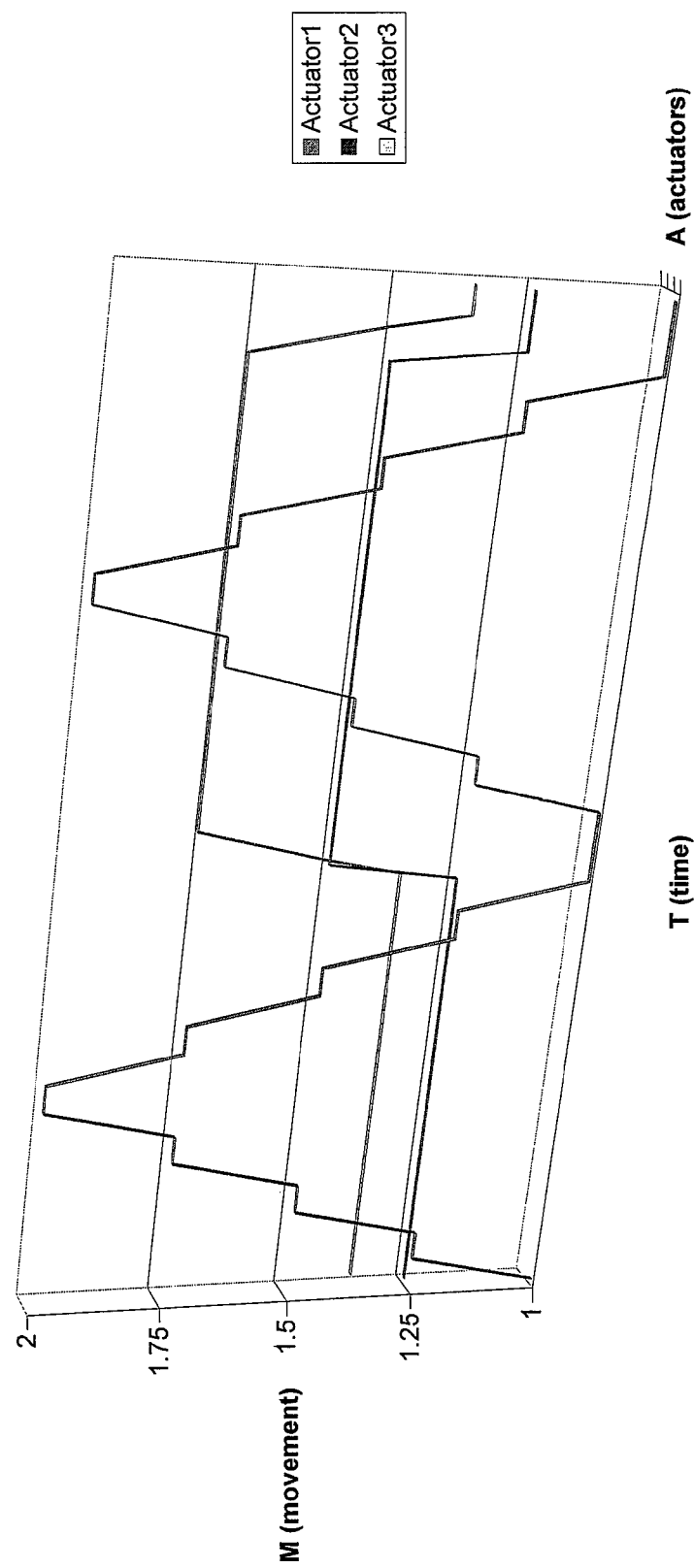

FIG. 16 is a graphic illustration of even another possible embodiment of a vehicle seating system. In the embodiment of FIG. 16, the control period includes alternating movement periods and stationary periods with reference to different actuators. Initially, actuators 2 and 3 are stationary at respective home positions while actuator 1 alternates between movement and stationary periods to slowly transition from a first position to a second position and back to the first position. Upon returning to the first position, actuator 1 remains stationary at the first position while actuators 2 and 3 transition to respective second positions. Thereafter, actuators 2 and 3 remain stationary at the respective second positions while actuator 1 again slowly transitions from a first position to a second position and back to the first position via alternating movement periods and stationary periods. Upon returning to the first position, actuator 1 remains stationary at the first position while actuators 2 and 3 transition from the respective second positions back to the respective home positions. In such embodiments, the actuators may continue such cycling pattern indefinitely.

Figure 17:
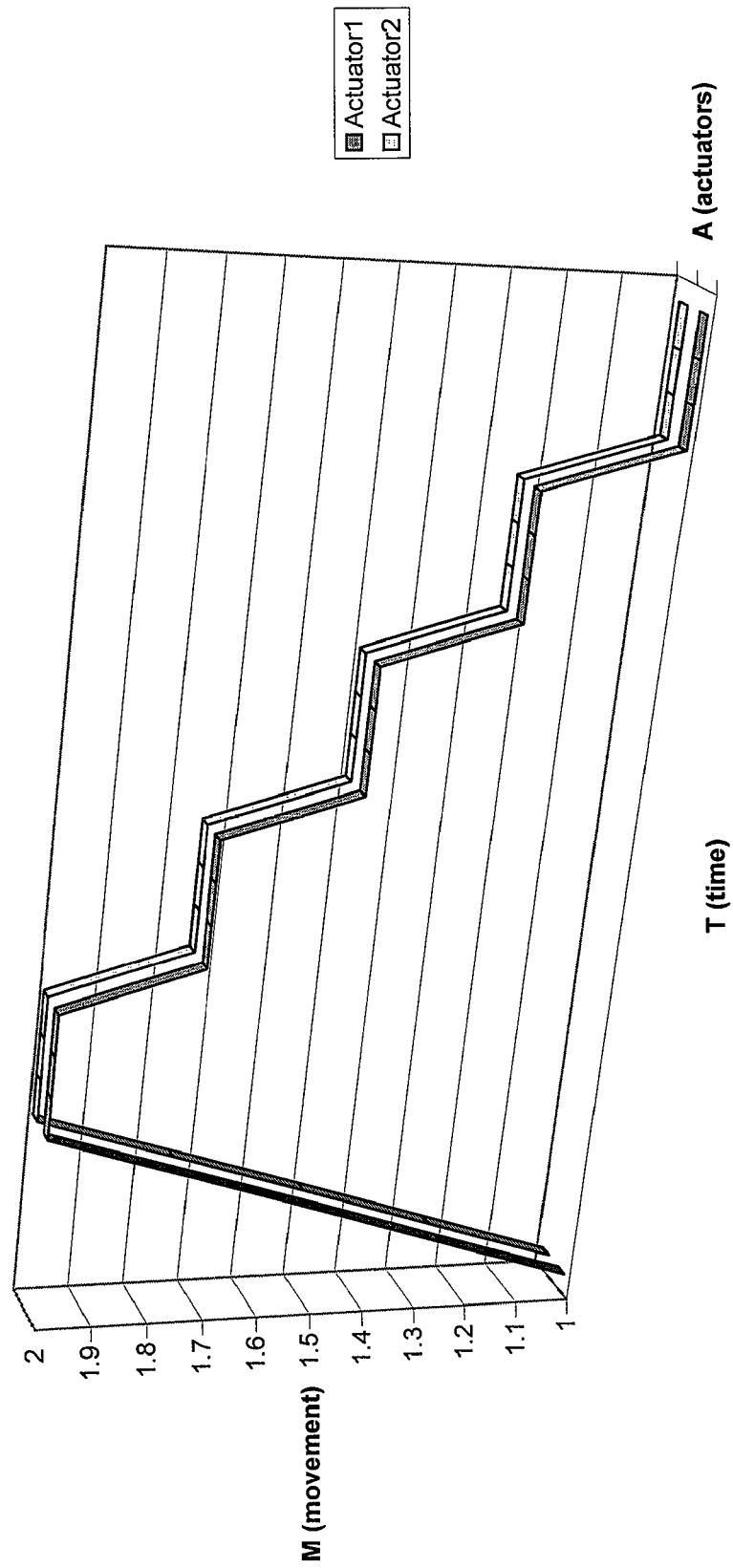

FIG. 17 is a graphic illustration of a further possible embodiment of a vehicle seating system. The illustrated embodiment in FIG. 17 includes an initial movement spike of actuators 1 and 2 from a first position to a second position, followed by alternating movement and stationary periods to return the actuators from the second position to the first position. In such embodiments, the initial movement spike includes increased relative movement of the actuators as compared to movement within the subsequent movement periods. As with the other embodiments, the first and second positions may be random, predetermined and/or pre-selected by a user as desired.

Additional embodiments of a vehicle seating system include a typical vehicle seat mountable in a vehicle, at least two powered seat adjustment actuators, such as energizer members including at least one thermal energizer to adjust the temperature of the seat, and an electrical controller. The energizer members may also include mechanical energizers, such as a massaging energizer, a thigh or seat-extending actuator and/or seat position actuators as described above. The energizer members are optionally able to transition between various settings in conjunction with the seat to provide comfort to a user of the system and impact the user's circulation, thereby reducing positional fatigue experienced by the user. The electrical controller may have a control period which generally includes at least one activation period and, in certain embodiments, at least one stationary or hold period. In a typical embodiment, the electrical controller initiates the control period after a first time period beginning when the vehicle is turned on. Thereafter, the control period may include at least one activation period where the energizer members automatically cycle through seating conditions to impact the user's circulation and reduce long distance traveling fatigue.

Figure 18:
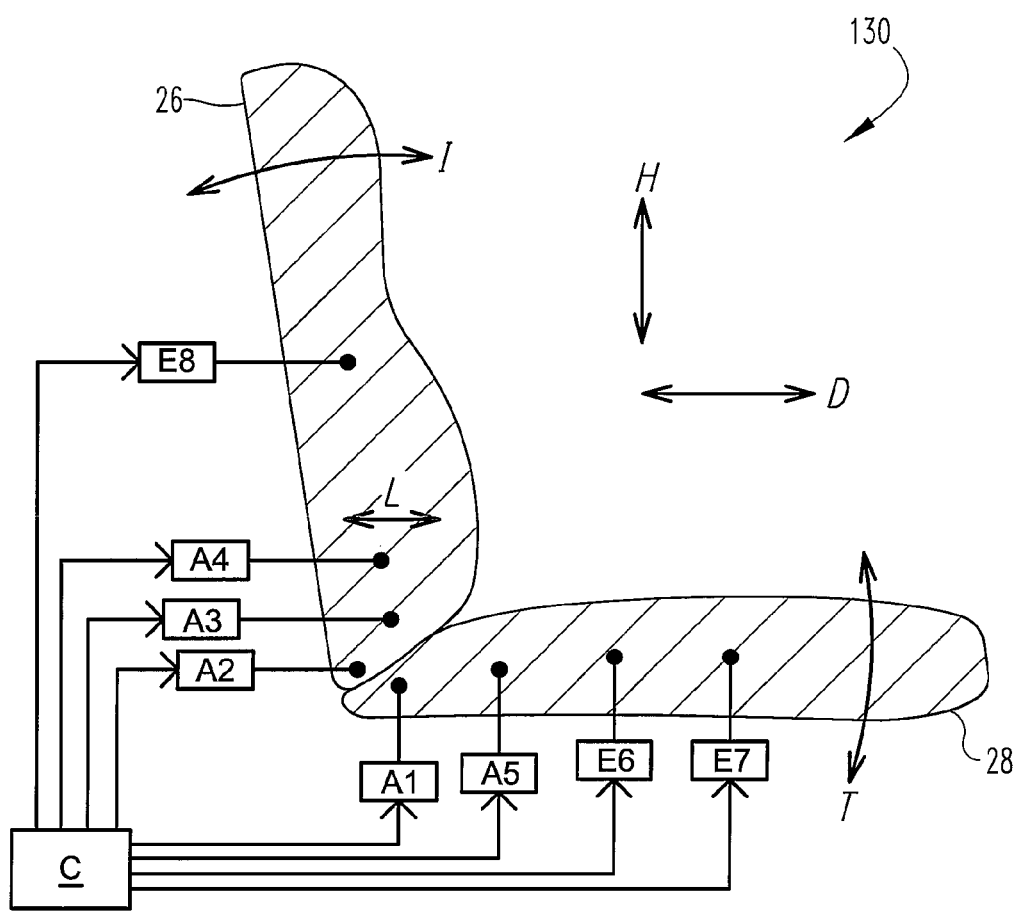
FIG. 18 is a side, partial cross-sectional view of a vehicle seating system embodiment.

Referring to FIG. 18, components of a seating system 130, similar in design and function to system 30, are illustrated. System 130 is designed to also help with one or more of the following: reduce user positional fatigue, reduce the effects of ischemia experienced by a user of the system during long distance traveling, and provide comfort to a user of the system. It should be appreciated that the system can be associated with any type of seat, including vehicular seat 22 as an example. System 130 can include various members, including powered seat position-adjustment actuators configured to move seat back 26 and seat bottom 28 in various manners, thereby altering the seating position formed by the seat. In certain embodiments, system 130 can include one or more of the position-adjustment actuators described in conjunction with system 30, including actuators A1 through A5. As described above, actuator A1 can move the seat along height axis H, actuator A2 can move the seat along distance axis D, actuator A3 can provide lumbar movement along lumbar axis L, actuator A4 can tilt the seat back along axis I and actuator A5 can tilt the seat bottom along axis T.

Additionally, the members of system 130 can include one or more thermal energizers configured to adjust the seating temperature of the seat and impact the circulation of a user of the system. As examples, system 130 can include a heating energizer E6 configured to provide heat to the seat and a cooling energizer E7 configured to provide a cooling effect to the seat. Further, in addition to position-adjustment actuators, such as actuators A1 through A5, system 130 can include other mechanical energizers, such as a massaging energizer E8 configured to provide a provide a massaging effect to the seat. As another example, systems 30 and/or 130 can include a seat-extending member which extends the seat underneath a user's thighs. It is contemplated that other members could be part of system 130 and/or system 30.

As described above, movement of the position-adjustment actuators A1 through A5 preferably includes a slow movement average of less than about 15 centimeters per second, and in some cases, less than about 10 centimeters per second. Additionally, in certain embodiments, each actuator A1 through A5 and energizer E6 through E8 transitions from a first status to a second status, and cycling of the energizer members includes transitioning from the first statuses to the second statuses and returning to the first statuses. In certain embodiments, the first status of each position-adjustment actuator A1 through A5 is a base position and the second status of each position-adjustment actuator is the opposite, completely extended position of each actuator A1 through A5 along the respective axis. Additionally, in certain embodiments, the first status of each energizer E6 through E8 is the standard "off" setting, and the second status is the standard "on" setting. However, in certain other embodiments, the first status of each energizer member is a desired setting or position, predetermined by the system or a user of the system.

Similar to system 30, system 130 generally includes electrical controller C to automatically activate, operate, and/or cycle through the various energizer members in a manner as to reduce positional fatigue, impact a user's circulation, and reduce the effects of ischemia. The electrical controller C may operate as described above in connection with system 30, including having a control period with stationary or hold periods, and movement or activation periods. In certain embodiments, massaging energizer E8 may include the use and operation of electronically controlled massage therapy systems. As an example, energizer E8 can include inflatable and deflatable gas or fluid chambers operable to provide a massaging effect through the seat back of the vehicle seat. In certain embodiments, energizer E8 can provide a vibratory massaging effect. Additionally, in certain embodiments, energizer E8 can provide a rolling massaging effect traveling up and down the seat back of the vehicle seat, such as through the use of a rolling cam. Regarding the thermal energizers, heating and cooling energizers E6 and E7 may include the use and operation of conductive fluid to provide the desired thermal effect. Additionally, heating energizer E6 may include the user and operation of one or more electrical elements to provide heat to the vehicle seat.

Figure 19:
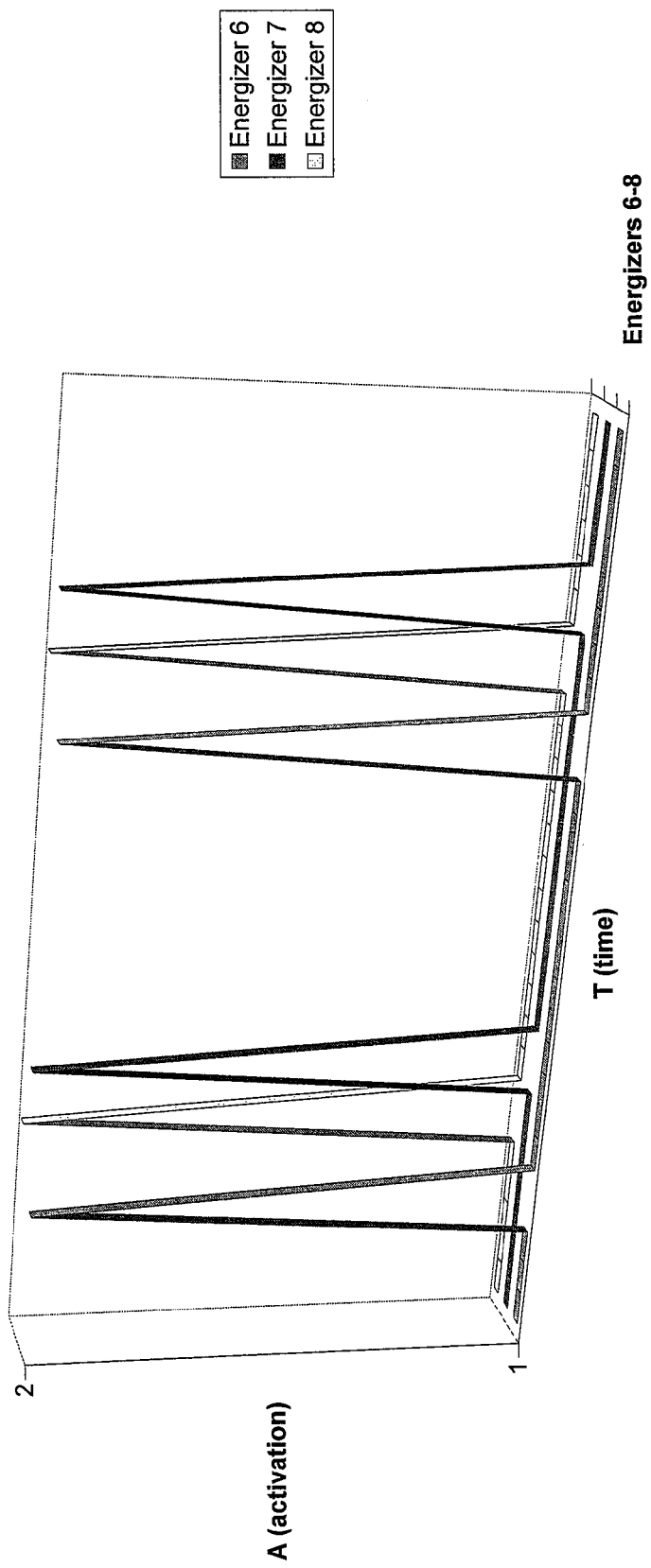
FIGS. 19-20 are graphic illustrations of further examples of condition profiles of a vehicle seating system.
Figure 20:
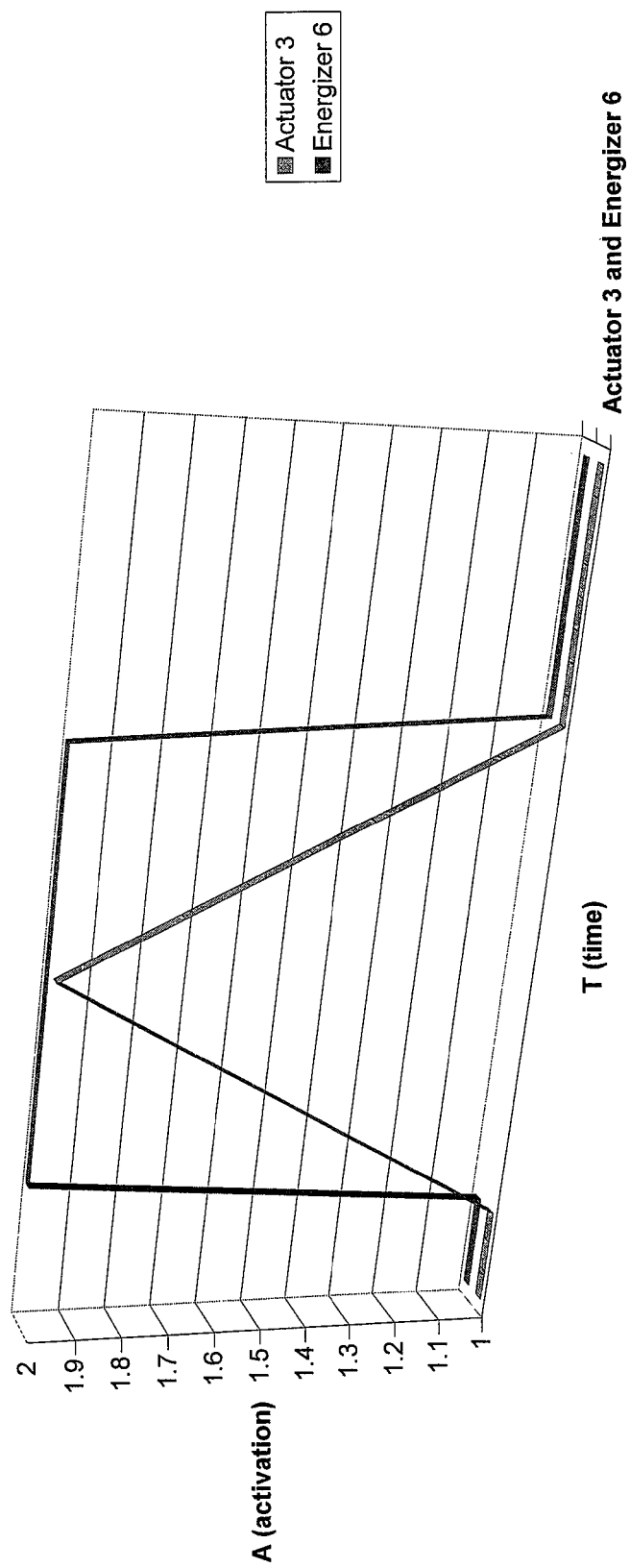

FIGS. 19-20 are graphic illustrations of various embodiments of a vehicle seating system. Similar to FIGS. 7-17, FIGS. 19-20 illustrate movement or activation of various energizer members along a horizontal Time axis and a vertical Activation axis. The Activation axes generally include a "1" denoting a first status and a "2" denoting a second status, and certain figures include delineations along the Activation axes denoting partial movement of the position-adjustment actuators between the first and second statuses. It should be appreciated that the first and second statuses can be various combinations of energizer members, and activation levels thereof, and can be randomly chosen or predetermined by the system or a user of the system. In certain embodiments, regarding energizers E6 through E8, the first situation "1" represents the particular energizer in the "off" position and the second situation "2" represents the particular energizer in the "on" position.

FIGS. 19-20 represent only two of the numerous possible embodiments of condition profiles of a vehicle seating system, such as system 130. In the illustrated embodiments, optionally a first time period passes before activation on Activation axis A of one or more energizer members begins. In certain embodiments, the initial activation of energizer members is the beginning of the control period. In certain other embodiments, the control period includes an initial period of time of inactivation of the energizer members. In other words, in certain embodiments the Time axis T begins with the vehicle turning on, and in certain other embodiments, the Time axis T begins with the beginning of the control period. Further, the illustrated embodiments are not meant to be limiting in any manner, including regarding the number of energizer members illustrated in the figures. It should be appreciated that the embodiments illustrated in the figures can include activation of a different number of energizer members. Also, although the condition profiles illustrated in FIGS. 19-20 are linear segments, they may optionally include curvilinear segments as well. It should be appreciated that the activity of the energizer members illustrated in the figures can continue indefinitely along the Time axis T, with only a segment of the activity shown for clarity. Also, any and all of the profiles in FIGS. 7-17 and 19-20 may be combined with each other.

FIG. 19 is a graphic illustration of a possible embodiment of a vehicle seating system, such as system 130 for example. The control period illustrated in FIG. 19 includes activation periods in which only one energizer member is initiated to transition through seating conditions at a time. In certain embodiments, a first energizer member transitions from a first status to a second status and back to a first status, with other energizer members then following the same pattern. In such embodiments, each energizer member includes periods of inactivity, with each activation period including only one energizer member transitioning at a time. In the embodiment illustrated in FIG. 19, heating energizer E6 initially transitions to the second status "2" for a certain amount of time, representing that the heating energizer is turned on, with the heating energizer E6 then transitioning back to the first status "1", representing that the heating energizer is turned off. According to the illustrated embodiment, following the activation of heating energizer E6, massaging energizer E8 follows a similar pattern and then cooling energizer E7 follows a similar pattern. A hold period follows activation of the cooling energizer E7, with the pattern continuing again after the hold period.

FIG. 20 illustrates another graphic illustration of a possible embodiment of a vehicle seating system, such as system 130 for example. In the embodiment illustrated in FIG. 20, the control period includes an activation period with one or more energizer members remaining at the second status while one or more other energizer members are slowly transitioning between the first and second statuses. In certain embodiments, the control period begins when the vehicle is turned on, and thereafter includes a hold period before activation of energizer members is initiated. Additionally, in certain embodiments, each activation period includes slow movement of at least one position-adjustment actuator, such as lumbar actuator A3, between the first and second statuses, while at least one thermal energizer, such as heating energizer E6, continually remains at the second "on" status. It is contemplated that the activation and hold periods can be longer or shorter in time, than as illustrated in FIG. 15, as would generally occur to one skilled in the art.

During the activation periods of the illustrated embodiment, the energizer members cycle at various speeds and through various statuses. For example, heating energizer E6 may transition to the second "on" status, remain at the second status for a certain time period and then transition back to the first "off" status. At the same time, in the illustrated embodiment, lumbar actuator A3 may be activated and slowly transition from a first status to a second status, and back to a first status. In other embodiments, lumbar actuator A3 could transition at least twice between the first and second statuses during one activation period. However, it should be appreciated that other patterns can be implemented for the energizer members. Additionally, it should be appreciated that the various patterns of the energizer members can be predetermined routines, randomly chosen routines, and/or can be pre-programmed by a user of the system.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A system, comprising:
 a vehicle seating system for reducing vehicle user fatigue including a seat and at least one powered seat adjustment actuator for altering the seating position formed by said seat;
 an electrical controller for automatically activating movement of said at least one actuator for suspending movement of said at least one actuator in response to a signal;
 a vehicle braking system including vehicle brakes and a brake pedal; and
 a sensor producing said signal sent in response to application of said vehicle brakes which leads to suspension of movement of said actuator during application of said vehicle brakes, and subsequent to release of said vehicle brakes said controller automatically activates movement of said at least one actuator, thereby altering the seating position formed by said seat.

2. The system of claim 1, wherein said signal suspends movement of said actuator for at least 10 seconds following the end of application of said vehicle brakes.

3. The system of claim 1, wherein suspension of movement of said actuator is for a hibernation period, wherein the length of time of said hibernation period is equal to the length of time of application of said vehicle brakes plus a delay period.

4. The system of claim 1, wherein said at least one powered seat adjustment actuator includes a first actuator to control horizontal movement of said seat, a second actuator to control inclining of the back portion of said seat, a third actuator to control lumbar movement of the back portion of said seat, a fourth actuator to control vertical movement of said seat, and a fifth actuator to control tilt of the bottom portion of said seat.

5. The system of claim 1, further comprising a sensor associated with said vehicle braking system, wherein said sensor is operable to detect application of said vehicle brakes and operable to produce said signal in response to application of said vehicle brakes.

6. The system of claim 5, wherein said sensor is positioned on said brake pedal and is operable to detect a user depressing said brake pedal.

7. The system of claim 1, further comprising an electrical controller for automatically activating movement of said at least one actuator in a predetermined profile and for suspending movement of said at least one actuator in response to said signal, said electrical controller having a control period.

8. The system of claim 7, wherein said electrical controller automatically activates movement of said at least one powered actuator at a speed of less than 15 centimeters per second.

9. The system of claim 7, wherein said actuator is moveable between a respective first position and a respective second position to reposition said seat to different seating positions between said first position and said second position, wherein said control period has at least one movement period and at least one stationary period, wherein said control period alternates between said movement periods and said stationary periods, said movement periods including movement between at least two different seating positions formed by said seat.

10. The system of claim 7, wherein said actuator is moveable between a respective first position and a respective second position to reposition said seat to different seating positions between said first position and said second position, said control period includes at least two hold periods, wherein after a first of said hold periods, said at least one powered actuator alters said seat to different seating positions formed by said seat, with one of said hold periods occurring after reaching each of said different seating positions.

11. The system of claim 7, wherein said electrical controller is operable to reactivate movement of said actuator after the end of application of said vehicle brakes.

12. The system of claim 11, wherein said seat occupies a temporary position when suspension of movement of said actuator occurs, and wherein said electrical controller is operable to reactivate movement beginning from said temporary position.

13. A system, comprising:
 vehicle seating means for reducing vehicle user fatigue;
 seat adjustment means for altering the seating position formed by said vehicle seating means;
 electrical controller means for automatically activating movement of said at least one actuator for suspending movement of said at least one actuator in response to a signal;
 vehicle braking means for decelerating the vehicle;
 sensing means for detecting activation of said vehicle braking means and producing said signal in response to said detecting; and
 means for suspending movement of said seat adjustment means during application of said vehicle braking means, and subsequent to release of said vehicle brakes said controller means automatically activates movement of said adjustment means, thereby alternating the seating position formed by said seat.

14. The system of claim 13, wherein said means for suspending movement suspends movement of said seat adjustment means for at least 10 seconds following the end of application of said vehicle braking means.

15. The system of claim 13, further comprising means for reactivating movement of said adjustment means subsequent to the end of application of said vehicle braking means.

16. The system of claim 15, wherein vehicle seating means occupies a suspended seating position when suspension of movement of said seat adjustment means occurs, and wherein said means for reactivating movement is operable to reactivate movement beginning from said suspended seating position.

17. The system of claim 15, wherein said seat adjustment means includes at least one powered seat adjustment actuator, wherein said at least one powered seat adjustment actuator includes a lumbar actuator to control lumbar movement of said vehicle seating means.

18. The system of claim 17, wherein said at least one powered seat adjustment actuator further includes a horizontal actuator to control horizontal movement of said vehicle seating means, an inclining actuator to control inclining of a back portion of said vehicle seating means, a vertical actuator to control vertical movement of said vehicle seating means, and a tilt actuator to control tilt of a bottom portion of said vehicle seating means.

19. The system of claim 13, further comprising electrical control means for automatically activating said seat adjustment means.

20. The system of claim 19, wherein said electrical control means includes a control period, wherein said control period has at least one movement period and at least one stationary period, wherein said control period alternates between said movement periods and said stationary periods, said movement periods including automatic activation of said seat adjustment means.

21. The system of claim 19, wherein said electrical control means automatically activates movement of said seat adjustment means at a speed of less than 15 centimeters per second.

22. The system of claim 19, wherein said sensing means includes a sensor operable to detect application of said vehicle braking means and operable to produce a signal in response to detecting application of said vehicle braking means.

23. The system of claim 22 wherein said means for suspending movement includes said signal sent from said sensing means upon detection of application of said vehicle braking means and, in response, said electrical control means suspending movement of said seat adjustment means.

24. The system of claim 1, wherein said electrical controller for automatically activating movement of said at least one actuator for suspending movement of said at least one actuator in response to said signal suspends movement while the vehicle is travelling.

25. The system of claim 9, wherein said electrical controller for automatically activating movement of said at least one actuator for suspending movement of said at least one actuator in response to said signal suspends movement while the vehicle is travelling.

26. The system of claim 13, wherein said electrical controller for automatically activating movement of said seat adjustment means for suspending movement of said at least one seat adjustment means in response to said signal suspends movement while the vehicle is travelling.

27. The system of claim 21, wherein said electrical controller for automatically activating movement of said seat adjustment means for suspending movement of said at least one seat adjustment means in response to said signal suspends movement while the vehicle is travelling.

* * * * *